US012587984B2

(12) United States Patent
Chen

(10) Patent No.: US 12,587,984 B2
(45) Date of Patent: Mar. 24, 2026

(54) METHOD FOR SMALL DATA TRANSMISSION IN RRC INACTIVE STATE AND RELATED DEVICES

(71) Applicant: PURPLEVINE INNOVATION COMPANY LIMITED, Hong Kong (HK)

(72) Inventor: Chiu-Wen Chen, Hong Kong (HK)

(73) Assignee: PURPLEVINE INNOVATION COMPANY LIMI, Hongkong (CN)

( * ) Notice: Subject to any disclaimer, the term of this patent is extended or adjusted under 35 U.S.C. 154(b) by 338 days.

(21) Appl. No.: 18/258,211

(22) PCT Filed: Dec. 23, 2021

(86) PCT No.: PCT/CN2021/140920
§ 371 (c)(1),
(2) Date: Jun. 19, 2023

(87) PCT Pub. No.: WO2022/135538
PCT Pub. Date: Jun. 30, 2022

(65) Prior Publication Data
US 2024/0057202 A1 Feb. 15, 2024

Related U.S. Application Data

(60) Provisional application No. 63/130,067, filed on Dec. 23, 2020.

(51) Int. Cl.
*H04W 56/00* (2009.01)
*H04W 72/23* (2023.01)
(Continued)

(52) U.S. Cl.
CPC ..... *H04W 56/0015* (2013.01); *H04W 56/001* (2013.01); *H04W 56/0045* (2013.01);
(Continued)

(58) Field of Classification Search
CPC ........... H04W 56/0015; H04W 56/001; H04W 56/0045; H04W 72/231; H04W 74/0833; H04W 76/27; H04W 72/23; H04W 74/002
See application file for complete search history.

(56) References Cited

U.S. PATENT DOCUMENTS 12,082,151 B2 * 9/2024 Lee ....................... H04W 76/27
2020/0015184 A1 * 1/2020 Yang ................. H04W 56/0055
(Continued)

FOREIGN PATENT DOCUMENTS

CN      110140409 A      8/2019

OTHER PUBLICATIONS

International Search Report in International application No. PCT/CN2021/140920,mailed on Mar. 22, 2022.
(Continued)

*Primary Examiner* — Jenee Holland
(74) *Attorney, Agent, or Firm* — PV IP PC; Wei Te Chung

(57) ABSTRACT

A method for small data transmission (SDT) in RRC_INACTIVE state and related devices are provided. The method includes receiving a SDT configuration, which is used for configuring SDT UL grant, wherein the SDT configuration comprises a SDT threshold; based on the SDT threshold, determining which type of SDT procedures is to be applied in RRC_INACTIVE state; upon reception of a Timing Advance (TA) command in the RRC_INACTIVE state, applying the TA command, and starting or restarting Timing Alignment Timer (TAT) for keeping uplink (UL) time alignment during SDT in the RRC_INACTIVE state; and applying the determined SDT procedure based on the started or restarted TAT, wherein the SDT configuration and/or the SDT UL grant is sustained even if the TAT expires. With this
(Continued)

method, UL synchronization/timing maintenance in RRC_I-NACTIVE state is realized.

16 Claims, 18 Drawing Sheets

(51) Int. Cl.

| | | |
|---|---|---|
| *H04W 72/231* | (2023.01) | |
| *H04W 74/0833* | (2024.01) | |
| *H04W 76/27* | (2018.01) | |

(52) U.S. Cl.
CPC ..... *H04W 72/231* (2023.01); *H04W 74/0833* (2013.01); *H04W 76/27* (2018.02)

(56) References Cited

U.S. PATENT DOCUMENTS

| | | | | |
|---|---|---|---|---|
| 2020/0314917 | A1 | 10/2020 | Jeon et al. | |
| 2021/0211947 | A1* | 7/2021 | Agiwal | H04W 72/23 |
| 2021/0307055 | A1* | 9/2021 | Tsai | H04W 76/30 |
| 2021/0337625 | A1* | 10/2021 | Tsai | H04W 76/19 |
| 2021/0410181 | A1* | 12/2021 | Jeon | H04W 52/0258 |
| 2022/0046749 | A1* | 2/2022 | Lin | H04W 76/30 |
| 2022/0046750 | A1* | 2/2022 | Jeon | H04W 36/06 |
| 2022/0182876 | A1* | 6/2022 | Lei | H04L 1/0007 |
| 2022/0304100 | A1* | 9/2022 | Tsai | H04W 76/27 |
| 2023/0120407 | A1* | 4/2023 | Huang | H04W 76/19 |
| | | | | 370/329 |
| 2023/0189245 | A1* | 6/2023 | Alfarhan | H04L 1/1854 |
| | | | | 370/329 |
| 2023/0189387 | A1* | 6/2023 | Jeon | H04W 72/23 |
| | | | | 370/242 |
| 2023/0276530 | A1* | 8/2023 | Jeon | H04W 36/305 |
| | | | | 370/329 |
| 2023/0284329 | A1* | 9/2023 | Agiwal | H04W 76/27 |
| | | | | 370/331 |
| 2023/0328795 | A1* | 10/2023 | Yang | H04B 17/328 |
| 2023/0345517 | A1* | 10/2023 | Xue | H04W 74/0833 |
| 2023/0354412 | A1* | 11/2023 | Christoffersson | H04W 74/002 |
| 2023/0371066 | A1* | 11/2023 | Christoffersson | H04W 72/02 |
| 2023/0379860 | A1* | 11/2023 | Rao | H04W 64/00 |
| 2023/0380003 | A1* | 11/2023 | Agiwal | H04W 72/21 |
| 2023/0388919 | A1* | 11/2023 | Wu | H04W 76/27 |
| 2023/0389081 | A1* | 11/2023 | Singh | H04W 72/23 |
| 2023/0397198 | A1* | 12/2023 | Turtinen | H04B 17/328 |
| 2023/0413207 | A1* | 12/2023 | Yue | H04W 56/0045 |
| 2023/0422288 | A1* | 12/2023 | Jiang | H04W 72/046 |
| 2024/0023042 | A1* | 1/2024 | Chen | H04W 74/0833 |
| 2024/0040626 | A1* | 2/2024 | Tseng | H04W 72/542 |
| 2024/0057202 | A1* | 2/2024 | Chen | H04W 56/001 |
| 2024/0155630 | A1* | 5/2024 | Agiwal | H04W 24/08 |
| 2024/0224209 | A1* | 7/2024 | Lee | H04W 76/30 |
| 2024/0276275 | A1* | 8/2024 | Kumar | H04W 74/0833 |
| 2025/0132890 | A1* | 4/2025 | Zhang | H04L 5/0094 |
| 2025/0193957 | A1* | 6/2025 | Decarreau | H04W 76/19 |

OTHER PUBLICATIONS

Written Opinion of the International Search Authority in International application No. PCT/CN2021/140920,mailed on Mar. 22, 2022.

NEC. R2-2009973, "Discussion on CG-based Small Data Transmissions" 3GPP TSG-RAN WG2 Meeting #112 electronic. Nov. 13, 2020(Nov. 13, 2020), section 2.

Ericsson. R2-2009966 "RRC aspects for SDT" 3GPP TSG-RAN WG2 #112e, Nov. 13, 2020 (Nov. 13, 2020), section 2.1.1.

Nokia et. al R2-2007489 "Small data transmission over pre-configured PUSCH resources" 3GPP TSG-RAN WG2 M#111e, Aug. 28, 2020 (Aug. 28, 2020), the whole document.

* cited by examiner

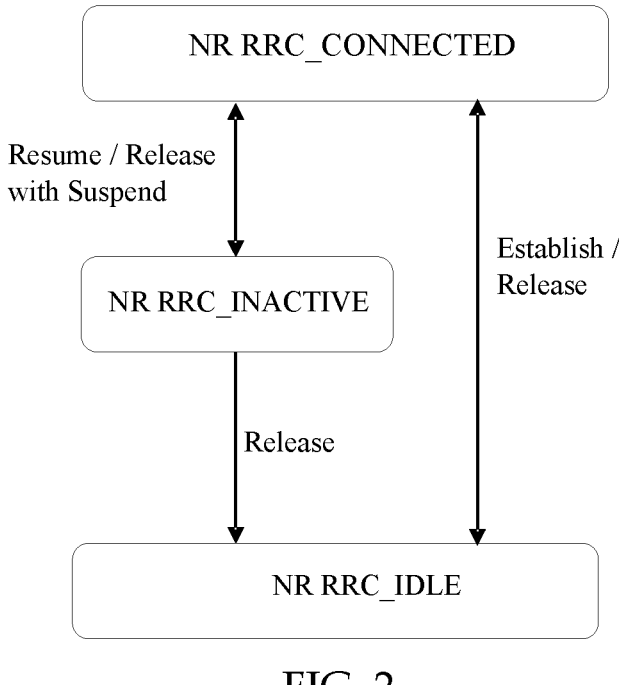

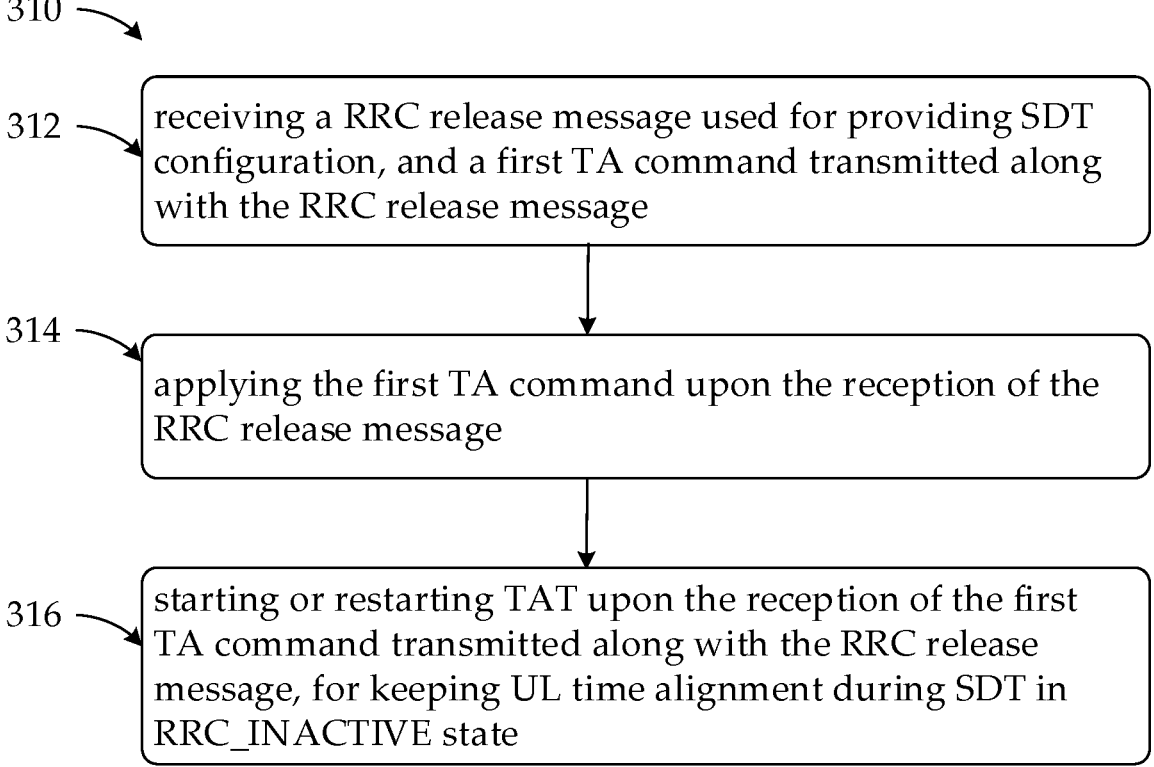

312 — receiving a RRC release message used for providing SDT configuration, and a first TA command transmitted along with the RRC release message 314 — applying the first TA command upon the reception of the RRC release message 316 — starting or restarting TAT upon the reception of the first TA command transmitted along with the RRC release message, for keeping UL time alignment during SDT in RRC_INACTIVE state

FIG. 3A

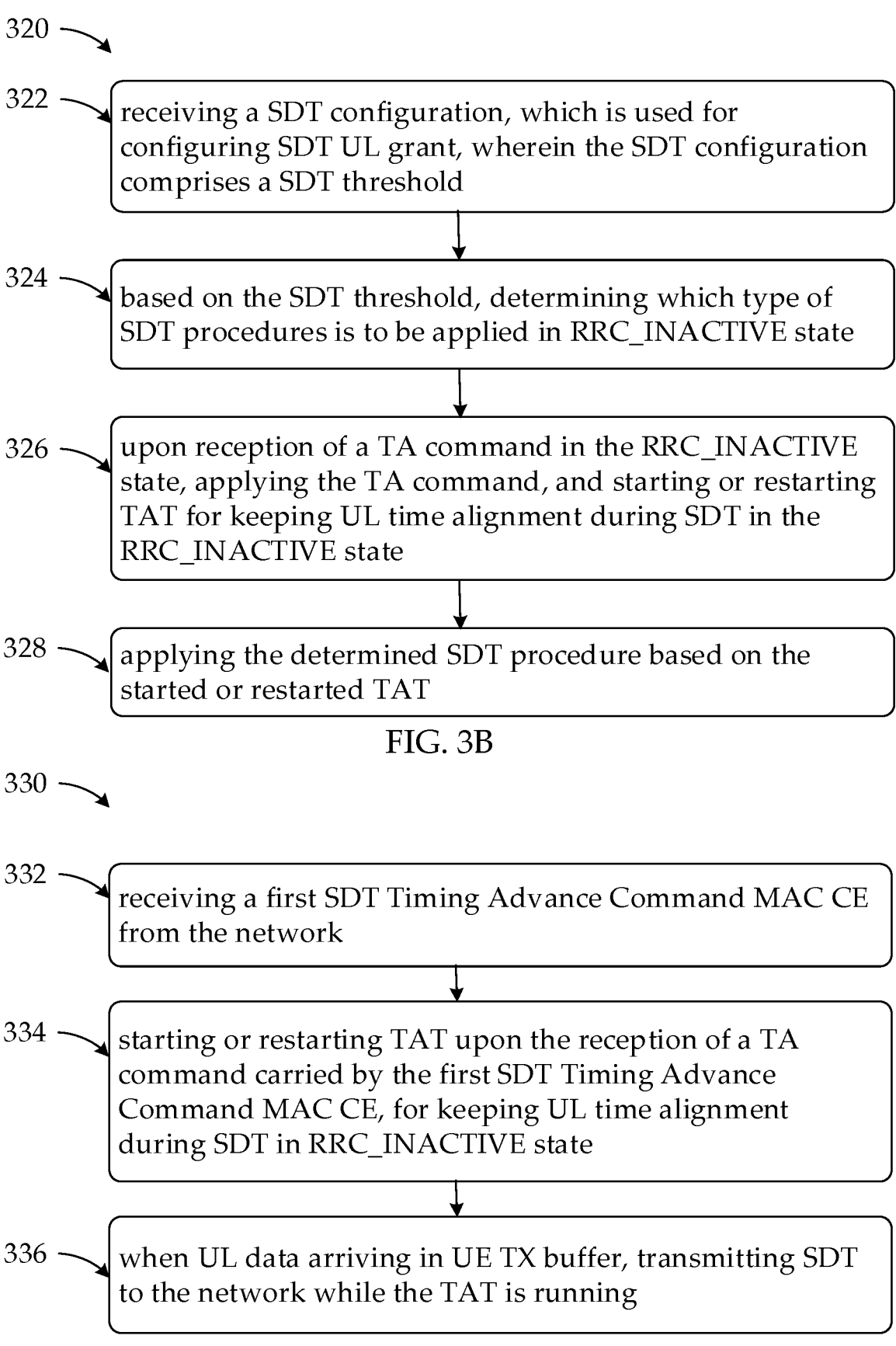

320

322  receiving a SDT configuration, which is used for configuring SDT UL grant, wherein the SDT configuration comprises a SDT threshold 324  based on the SDT threshold, determining which type of SDT procedures is to be applied in RRC_INACTIVE state 326  upon reception of a TA command in the RRC_INACTIVE state, applying the TA command, and starting or restarting TAT for keeping UL time alignment during SDT in the RRC_INACTIVE state 328  applying the determined SDT procedure based on the started or restarted TAT

332  receiving a first SDT Timing Advance Command MAC CE from the network 334  starting or restarting TAT upon the reception of a TA command carried by the first SDT Timing Advance Command MAC CE, for keeping UL time alignment during SDT in RRC_INACTIVE state 336  when UL data arriving in UE TX buffer, transmitting SDT to the network while the TAT is running

FIG. 3C

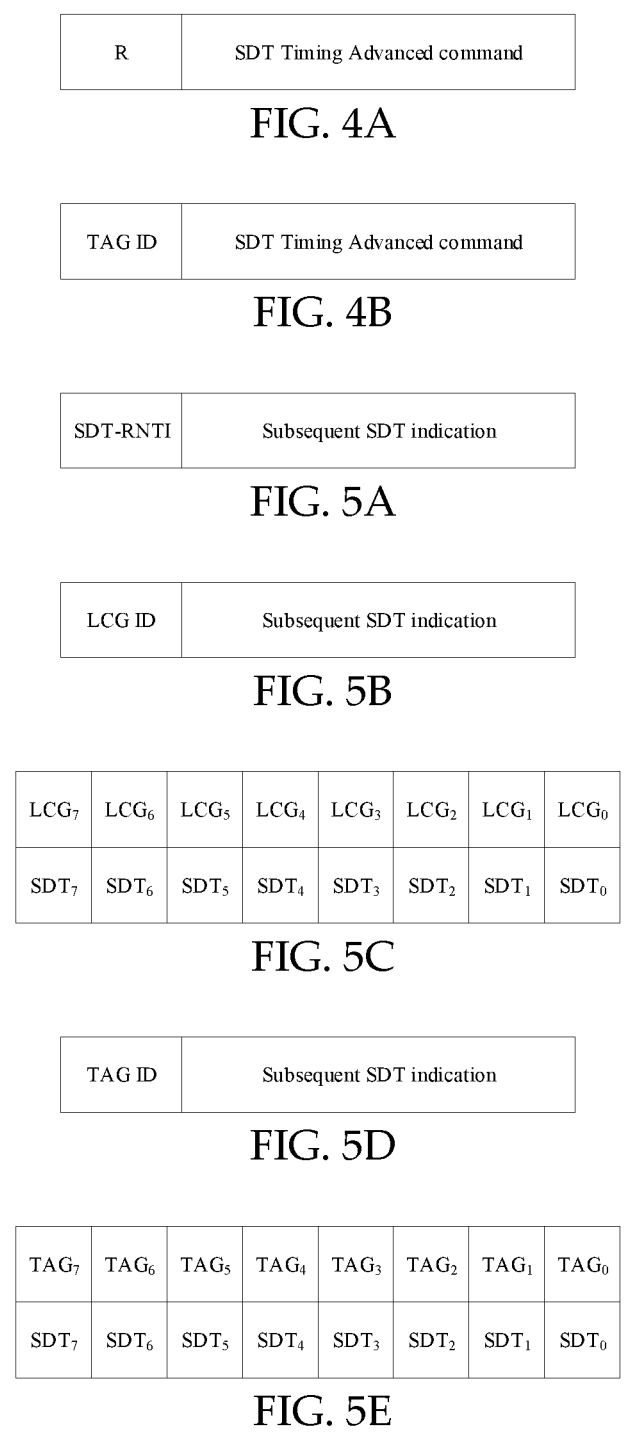

| R | SDT Timing Advanced command |
|---|---|

FIG. 4A

| TAG ID | SDT Timing Advanced command |
|---|---|

FIG. 4B

| SDT-RNTI | Subsequent SDT indication |
|---|---|

FIG. 5A

| LCG ID | Subsequent SDT indication |
|---|---|

FIG. 5B

| $LCG_7$ | $LCG_6$ | $LCG_5$ | $LCG_4$ | $LCG_3$ | $LCG_2$ | $LCG_1$ | $LCG_0$ |
|---|---|---|---|---|---|---|---|
| $SDT_7$ | $SDT_6$ | $SDT_5$ | $SDT_4$ | $SDT_3$ | $SDT_2$ | $SDT_1$ | $SDT_0$ |

FIG. 5C

| TAG ID | Subsequent SDT indication |
|---|---|

FIG. 5D

| $TAG_7$ | $TAG_6$ | $TAG_5$ | $TAG_4$ | $TAG_3$ | $TAG_2$ | $TAG_1$ | $TAG_0$ |
|---|---|---|---|---|---|---|---|
| $SDT_7$ | $SDT_6$ | $SDT_5$ | $SDT_4$ | $SDT_3$ | $SDT_2$ | $SDT_1$ | $SDT_0$ |

FIG. 5E

METHOD FOR SMALL DATA TRANSMISSION IN RRC INACTIVE STATE AND RELATED DEVICES

TECHNICAL FIELD

The present disclosure relates to the field of wireless communications, and more particularly, to a method for small data transmission (SDT) in RRC_INACTIVE state and related devices.

BACKGROUND ART

Communication systems and networks have developed towards being a broadband and mobile system. In cellular wireless communication systems developed by the Third Generation Partnership Project (3GPP), user equipment (UE) is connected by a wireless link to a radio access network (RAN). The RAN includes a set of base stations (BSs) which provide wireless links to the UEs located in cells covered by the base station, and an interface to a core network (CN) which provides overall network control. As will be appreciated the RAN and CN each conduct respective functions in relation to the overall network. The 3GPP has developed the so-called Long Term Evolution (LTE) system, namely, an Evolved Universal Mobile Telecommunication System Territorial Radio Access Network (E-UTRAN), for a mobile access network where one or more macro-cells are supported by a base station known as an eNodeB or eNB (evolved NodeB). More recently, evolved from LTE, the so-called 5G or New radio (NR) systems where one or more cells are supported by a base station known as a gNB.

In LTE, the network may order the UE to get into an RRC_IDLE state if the UE has no activity for a while. This is done to reduce UE's power consumption. The UE needs to transit from the RRC_IDLE state to an RRC_CONNECTED state whenever the UE needs to perform some activity. Since small amounts of data have to be sent very frequently in current mobile communication applications, frequent Idle-Connected-Idle transitions increase network signaling load and latency. Therefore, 5G NR has defined a new state called RRC_INACTIVE to reduce network signaling load and latency involved in transiting to RRC_CONNECTED state. In NR, a UE is in RRC_CONNECTED when an RRC connection has been established or in RRC_INACTIVE when the RRC connection is suspended. If this is not the case, the UE is in RRC_IDLE state, that is, no RRC connection is established.

More specifically, in RRC_INACTIVE state, the UE Access Stratum (AS) context is stored at both UE and network sides so that the core network connection is maintained (i.e., the UE keeps in CM (abbreviated from Connection Management)-CONNECTED) and the radio access network (RAN) connection is released. The network can reach the inactive UE through RAN or CN Paging messages.

Random Access (RA) procedures can be classified into a Contention Free Random Access (CFRA) type and a Contention-based Random Access (CBRA) type. For CFRA, a Preamble is allocated by the gNB and such a preamble is known as dedicated random access preamble. The dedicated preamble may provide to UE via RRC signaling (allocating preamble can be configured within an RRC message). Therefore, the UE can transmit the dedicated preamble without contention. For CBRA, the UE selects a Preamble randomly from a preamble group shared with other UEs. This means that the UE has a potential risk of selecting the same preamble as another UE and subsequently may experience collision. The gNB uses a contention resolution mechanism to handle the access requests. In this procedure, the result is random and not all Random Access succeeds.

The contention-free or contention-based RA procedure can be a four-step (4-step) procedure or a two-step (2-step) procedure. Taking 4-step contention-based Random Access RA procedure for example, the UE transmits a contention-based PRACH preamble, also known as MSG1. After detecting the preamble, the gNB responds with a random-access response (RAR), also known as MSG2. The RAR includes an uplink grant for scheduling a PUSCH transmission from the UE known as MSG3. In response to the RAR, the UE transmits MSG3 including an ID for contention resolution. Upon receiving MSG3, the network transmits a contention resolution message, also known as MSG4, with the contention resolution ID. The UE receives MSG4, and if the UE finds its contention-resolution ID it sends an acknowledgement on a PUCCH, which completes the 4-step random access procedure.

The 2-step RA procedure is to reduce latency and control signaling overhead by having a single round trip cycle between the UE and the base station. This is achieved by combining the preamble (MSG1) and the scheduled PUSCH transmission (MSG3) into a single message (MSGA) from the UE to the gNB, known as MSGA and by combining the random-access respond (MSG2) and the contention resolution message (MSG4) into a single message (MSGB) from the gNB to UE. The 2-step procedure and the 4-step procedure can be applied to the CFRA in the case that the dedicated preamble is provided to the UE.

Until 3GPP Rel-16, data transmission is only supported in RRC_CONNECTED state. When a UE stays in RRC_INACTIVE and UL data arrive in TX buffer, the UE has to resume the connection (i.e., move to RRC_CONNECTED state) for data transmission. Connection setup and subsequently release to RRC_INACTIVE state happens for each data transmission. However, for small and infrequent the data packets are, this results in unnecessary power consumption and signaling overhead.

On the other hand, the UE has a configurable timing alignment timer which is used to control how long the UE is considered uplink timing aligned with the associated cell. Currently, timing alignment timer configuration is only valid and used in RRC_CONNECTED state as specified in 3GPP specification. The timing alignment timer is stopped upon the UE entering RRC_INACTIVE state whenever Media Access Control (MAC) is reset. The consequence is that the UE regards the uplink synchronization is broken.

Therefore, when the small data is able to transmit in RRC_INACTIVE state, there is a need of design the operations for managing the UL time alignment. Meanwhile, a timing misalignment should be recovered in RRC_INACTIVE for small data transmission without transiting to RRC_CONNECTED state.

SUMMARY

Technical Problem

An object of the present disclosure is to propose a method for small data transmission (SDT) in RRC_INACTIVE state and related devices (such as a user equipment (UE) and/or a base station (BS)), which can solve issues in the prior art, realize UL synchronization/timing maintenance, improve resource efficiency, improve power consumption and signaling overhead, and/or provide a good communication performance.

Technical Solution

In a first aspect of the present disclosure, a method for small data transmission (SDT) in RRC_INACTIVE state, performed by a user equipment (UE) in a network, the method including: receiving a SDT configuration, which is used for configuring SDT UL grant, wherein the SDT configuration comprises a SDT threshold; based on the SDT threshold, determining which type of SDT procedures is to be applied in RRC_INACTIVE state; upon reception of a Timing Advance (TA) command in the RRC_INACTIVE state, applying the TA command, and starting or restarting Timing Alignment Timer (TAT) for keeping uplink (UL) time alignment during SDT in the RRC_INACTIVE state; and applying the determined SDT procedure based on the started or restarted TAT, wherein the SDT configuration and/or the SDT UL grant is sustained even if the TAT expires.

In a second aspect of the present disclosure, a method for small data transmission (SDT) in RRC_INACTIVE state, performed by a base station (BS) in a network, the method including: transmitting to a user equipment (UE) a SDT configuration, which is used for configuring SDT UL grant, wherein the SDT configuration comprises a SDT threshold; expecting the UE to determine, based on the SDT threshold, which type of SDT procedures is to be applied in RRC_INACTIVE state; upon transmission of a Timing Advance (TA) command in the RRC_INACTIVE state, expecting the UE to apply the TA command, and start or restart Timing Alignment Timer (TAT) for keeping uplink (UL) time alignment during SDT in the RRC_INACTIVE state; and expecting the UE to apply the determined SDT procedure based on the started or restarted TAT, wherein the BS expects the UE to sustain the SDT configuration and/or the SDT UL grant even if the TAT expires.

In a third aspect of the present disclosure, a user equipment includes a memory, a transceiver and a processor coupled to the memory and the transceiver, the processor configured to call and run program instructions stored in a memory, to execute the afore-described method for SDT in RRC_INACTIVE state.

In a fourth aspect of the present disclosure, a base station includes a memory, a transceiver and a processor coupled to the memory and the transceiver, the processor configured to call and run program instructions stored in a memory, to execute the afore-described method for SDT in RRC_INAC-TIVE state.

In a fifth aspect of the present disclosure, a non-transitory machine-readable storage medium has stored thereon instructions that, when executed by a computer, cause the computer to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a ninth aspect of the present disclosure, a computer program causes a computer to execute the above method.

DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

FIG. 2 is a schematic diagram illustrating an overview of UE RRC state transitions in NR.

FIG. 3A illustrates a method for small data transmission (SDT) in RRC_INACTIVE state according to an aspect of the present disclosure.

FIG. 3B illustrates a method for small data transmission (SDT) in RRC_INACTIVE state according to another aspect of the present disclosure.

FIG. 3C illustrates a method for small data transmission (SDT) in RRC_INACTIVE state according to yet another aspect of the present disclosure.

FIG. 4A illustrates an example of a SDT Timing Advance Command MAC CE according to the present disclosure.

FIG. 4B illustrates another example of a SDT Timing Advance Command MAC CE according to the present disclosure.

FIG. 5A illustrates an example of a subsequent SDT MAC CE according to the present disclosure.

FIG. 5B illustrates an example of a LCG-based subsequent SDT MAC CE according to the present disclosure.

FIG. 5C illustrates another example of a LCG-based subsequent SDT MAC CE according to the present disclosure.

FIG. 5D illustrates an example of a TAG-based subsequent SDT MAC CE according to the present disclosure.

FIG. 5E illustrates another example of a TAG-based subsequent SDT MAC CE according to the present disclosure.

DETAILED DESCRIPTION OF EMBODIMENTS

Embodiments of the disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

In this document, the term "/" should be interpreted to indicate "and/or."

Figure 1A:
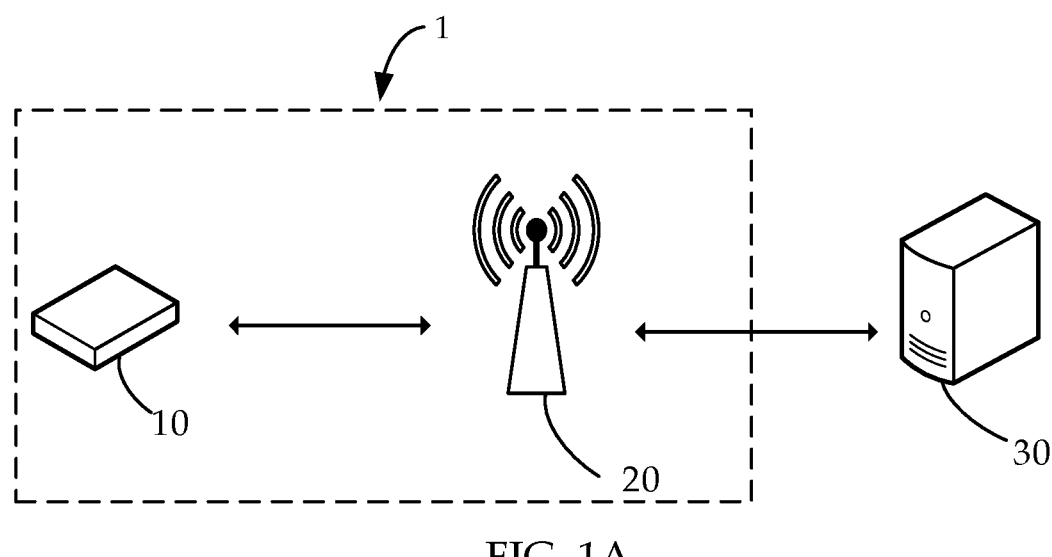
FIG. 1A is a schematic diagram illustrating a communication controlling system according to an embodiment of the present disclosure.
Figure 1B:
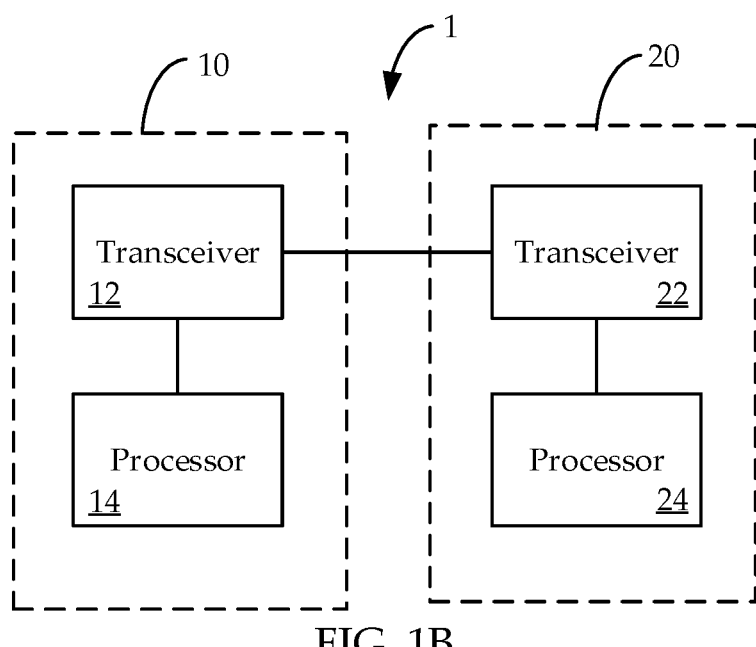
FIG. 1B is a block diagram of a user equipment and a base station of wireless communication in a communication controlling system according to an embodiment of the present disclosure.

A schematic view and a functional block diagram of a communication controlling system 1 according to the present invention are shown in FIG. 1A and FIG. 1B, respectively. The communication controlling system 1 comprises a user equipment 10 and a base station 20. The user equipment 10 and the base station 20 may communicate with each other either wirelessly or in a wired way. The base station 20 and a next generation core network 30 may also communicate with each other either wirelessly or in a wired way. When the communication controlling system 1 complies with the New Radio (NR) standard of the 3rd Generation Partnership Project (3GPP), the next generation core network (5GCN) 30 is a backend serving network system and may comprise a Access and Mobility Management Function (AMF), User Plane Function (UPF), and a Session Management Function (SMF).

The user equipment 10 may be a non-NPN capable apparatus or a non-public network (NPN) capable apparatus, but the present invention is not limited to this. The user equipment 10 comprises a transceiver 12 and a processor 14, which are electrically connected with each other. The base station 20 comprises a transceiver 22 and a processor 24, which are electrically connected with each other. The transceiver 12 of the user equipment 10 is configured to transmit a signal to the base station 20 and the processor 24 of the base station 20 processes the signal, the transceiver 22 of the base station 20 is configured to transmit a signal to the user equipment 10 and the processor 14 of the user equipment 10 processes the signal. In this way, the user equipment 10 communicates with the base station 20 each other.

FIG. 2 shows an overview of UE Radio Resource Control (RRC) state transitions in NR. A UE is either in RRC_CONNECTED state or in RRC_INACTIVE state when an RRC connection has been established. In RRC_INACTIVE state, the network and UE store the UE inactive AS context for small data transmission (SDT) with lower power consumption. For SDT in RRC_INACTIVE state, the UE receives an RRCRelease with suspend configuration (e.g., SDT configuration) and resumes the RRC connection if necessary. If this is not the case, i.e., RRC connection is released, the UE is in RRC_IDLE state.

A time alignment Small Data Transmission (SDT) procedure for the inactive UE is proposed in this invention. There are three types of SDT procedures in RRC_INACTIVE state as follows:

2-step RACH based SDT: UL and DL data is multiplexed with the MSGA and MSGB respectively. The contention-based and/or contention-free based RACH can be supported for SDT in RRC_INACTIVE state.

4-step RACH based SDT: UL and DL data is multiplexed with the MSG3 and MSG4 respectively. The contention-based and/or contention-free based RACH can be supported for SDT in RRC_INACTIVE state.

Configured grant (CG) based SDT: UL/DL data is transmitted on the pre-configured resources based on CG-based SDT configuration and DL assignment configuration for SDT.

The present disclosure provides a method for managing the uplink (UL) time alignment for UE in RRC_INACTIVE state. A time alignment SDT procedure for the inactive UE is proposed in the present invention. In accordance with an aspect of the present invention, a control information from the network (e.g., SDT Timing Advance Command MAC CE) is used to control the amount of timing adjustment that UE needs to apply. In accordance with another aspect of the present invention, an assistance information from the UE (e.g., subsequent SDT indication) is used to indicate what SDT resource the UE needs. The invention is beneficial for resource efficiency of the network and power efficiency of the UE.

FIG. 3A illustrates a method 310 for small data transmission (SDT) in RRC_INACTIVE state according to an aspect of the present disclosure. The method 310 is performed by a user equipment (UE) in a network. The method 310 may include the following steps. In Block 312, a Radio Resource Control (RRC) release message used for providing SDT configuration, and a timing advance (TA) command transmitted along with the RRC release message are transmitted by the BS or the network and received by the UE. In Block 314, the UE applies and the BS or the network expects the UE to apply the TA command upon the reception of the RRC release message. In Block 316, the UE starts or restarts and the BS or the network expects the UE to start or restart Timing Alignment Timer (TAT) upon the reception of the TA command transmitted along with the RRC release message, for keeping uplink (UL) time alignment during SDT in RRC_INACTIVE state. This can solve issues in the prior art, realize UL synchronization/timing maintenance, improve resource efficiency, improve power consumption and signaling overhead, and/or provide a good communication performance.

In this aspect of the present disclosure, the UE receives from the network a RRC release message (e.g., RRCRelease) and a TA command transmitted along with the RRC release message. For example, the UE may transit from RRC_CONNECTED state or in RRC_INACTIVE state when receiving the RRC release message, which is used for suspending a RRC connection. The RRC release message also includes SDT configuration, which is necessary configuration for the UE to perform SDT in RRC_INACTIVE state. The TA command may indicate an index value to control an amount of timing adjustment that the UE needs to apply during SDT in RRC_INACTIVE state. Upon the reception of the RRC release message and the TA command, the UE applies the TA command for time alignment with the network. Once the UE receives the TA command, the UE also starts or restarts a timing alignment timer for keeping uplink (UL) time alignment during SDT in RRC_INACTIVE state. During the TAT is running and is not expired, time alignment is realized in RRC_INACTIVE state between the UE and the network. Therefore, UL synchronization for the SDT in RRC_INACTIVE state is realized.

FIG. 3B illustrates a method 320 for small data transmission (SDT) in RRC_INACTIVE state according to another aspect of the present disclosure. The method 320 is performed by a user equipment (UE) in a network. The method 320 may include the following steps. In Block 322, the network transmits and the UE receives a SDT configuration used for configuring SDT UL grant, and the SDT configuration also includes a SDT threshold. In Block 324, based on the SDT threshold, the UE determines and the network expects the UE to determine which type of SDT procedures is to be applied in RRC_INACTIVE state. In Block 326, the UE receives a Timing Advance (TA) command from the network, and upon reception of the TA command in the RRC_INACTIVE state, the UE applies and the network expects the UE to apply the TA command, and start or restart Timing Alignment Timer (TAT) for keeping uplink (UL) time alignment during SDT in the RRC_INACTIVE state. In Block 328, the UE apply and the network expects the UE to apply the determined SDT procedure based on the started or restarted TAT. The SDT configuration or the SDT UL grant is sustained even if the TAT expires. This can solve issues in the prior art, realize UL synchronization/timing maintenance, improve resource efficiency, improve power consumption and signaling overhead, and/or provide a good communication performance.

In this aspect of the present disclosure, SDT configuration including a SDT threshold is transmitted from the network and received by the UE. The SDT configuration is used for configuring SDT UL grant and may be included in a RRC release message (e.g., RRCRelease), for example. The UE may transit from RRC_CONNECTED state or in RRC_INACTIVE state when receiving the RRC release message, which is used for suspending a RRC connection. In this method, the SDT configuration and/or the SDT UL grant is sustained even if the TAT expires. For instance, when the UE transits to RRC_INACTIVE state from RRC_Connected state, during which the TAT expires, the SDT configuration or the SDT UL grant is sustained.

The UE can determine which type of SDT procedures is to be applied in RRC_INACTIVE state, based on the SDT threshold in the SDT configuration. The SDT threshold may be a data volume threshold, which is a threshold for the data volume that is to be transmitted in RRC_INACTIVE state. The type of SDT procedures may include Configured Grant (CG)-based SDT and Random Access Channel (RACH)-based SDT (e.g., 2-step RACH-based SDT, 4-step RACH-based SDT) procedures. The UE receives a TA command from the BS or the network. The TA command may be transmitted along with the RRC release message before the UE transits to RRC_INACTIVE state, for example. In another case, the TA command may be received by the UE while the UE is in RRC_INACTIVE state. Upon receiving the TA command, the UE applies the TA command to apply an amount of timing adjustment that the UE needs to apply during SDT in RRC_INACTIVE state. Also, the UE starts or restarts Timing Alignment Timer (TAT) for keeping uplink (UL) time alignment during SDT in the RRC_INACTIVE state. After the UL time alignment with the network, the UE applies the determined type of SDT procedure. For example, if the CG-based SDT is determined, CG-based SDT procedure is performed. Therefore, UL synchronization for the SDT in RRC_INACTIVE state is realized.

FIG. 3C illustrates a method 330 for small data transmission (SDT) in RRC_INACTIVE state according to yet another aspect of the present disclosure. The method 330 is performed by a user equipment (UE) in a network. The method 330 may include the following steps. In Block 332, the network transmits and the UE receives a SDT Timing Advance Command Media Access Control (MAC) Control Element (CE) from the network. In Block 334, the UE starts or restarts and the network expects the UE to start or restart Timing Alignment Timer (TAT) upon the reception of a Timing Advance (TA) command carried by the SDT Timing Advance Command MAC CE, for keeping uplink (UL) time alignment during SDT in RRC_INACTIVE state. In Block 336, when UL data arriving in UE TX buffer, the UE transmits and the network receives SDT while the TAT is running. This can solve issues in the prior art, realize UL synchronization/timing maintenance, improve resource efficiency, improve power consumption and signaling overhead, and/or provide a good communication performance.

In this aspect of the present disclosure, a Timing Advance (TA) command may be carried by a SDT Timing Advance Command MAC CE. The TA command may indicate an index value to control an amount of timing adjustment that the UE needs to apply during SDT in RRC_INACTIVE state. Upon reception of the TA command, the UE starts or restarts TAT for keeping uplink (UL) time alignment during SDT in RRC_INACTIVE state. During the TAT is running and is not expired, time alignment is realized in RRC_INACTIVE state between the UE and the network. When there are UL data arriving in UE TX buffer, the UE can transmit SDT to the BS or the network while the TAT is running. Therefore, UL synchronization for the SDT in RRC_INACTIVE state is realized.

In some embodiments, the SDT configuration is configured/updated via RRC signaling for SDT UL grant. In some cases, the SDT configuration configured/updated via the system information is common/UE-specific SDT configuration, and the SDT UL grant is shared SDT UL grant within UEs that belong to the RRC_INACTIVE state. In some embodiments, the UE may be configured with the SDT configuration via system information for SDT UL grant. In some cases, the SDT configuration configured via the RRC signaling is UE-specific SDT configuration, and the SDT UL grant is dedicated SDT UL grant within one or more UEs that belong to the RRC_INACTIVE state. In some embodiments, the SDT configuration comprises a SDT threshold used for the UE to determine which SDT type is applied in the RRC_INACTIVE state. In some embodiments, the SDT configuration comprises a SDT_reference signal received power (RSRP) threshold used for the UE to determine whether to perform activation of the SDT UL grant in the RRC_INACTIVE state. In some embodiments, the SDT configuration comprises SDT PRACH configuration, which indicates one or more specific preamble groups used for RACH-based SDT procedure in the RRC_INACTIVE state. In some cases, the one or more specific preamble groups for SDT in the RRC_INACTIVE state is used to inform the network for subsequent SDT in the RRC_INACTIVE such that subsequent UL grant of SDT is allocated or activated, or the one or more specific preamble groups for SDT in the RRC_INACTIVE state is used to inform the network associated amount of SDT data volume or SDT traffic statistics or pattern.

From network's perspective, those UL grant resource can be shared or dedicated for the UEs. It is up to the network implementation. For the subsequent SDT, the scrambling initialization of PDSCH associated with PDCCH is used by 5G NR Radio Network Temporary Identifier (e.g., C-RNTI (C is abbreviated from "cell"), SDT-RNTI, I-RNTI (I is abbreviated from "inactive"), P-RNTI (P is abbreviated from "paging")) in RRC_INACTIVE state. A UE may be configured to decode PDCCH with CRC scrambled by the C-RNTI, SDT-RNTI, I-RNTI, and/or P-RNTI for dedicated and/or shared subsequent SDT procedure. The UE shall decode the PDCCH and the corresponding PDSCH based on 5G NR RNTI.

The network may broadcast/unicast the common/UE-specific SDT configuration (e.g., supported SDT types, SDT priority, common/UE-specific SDT search space, common SDT threshold, common SDT_RSRP threshold, SDT Paging configuration and search space, RACH-based SDT configuration, SDT PRACH configuration, etc.) via system information (e.g., SIB2, on-demand SI) for shared SDT UL grant within UEs. The shared SDT UL grant is a shared resource between multiple UEs belong to RRC_CONNECTED/RRC_INACTIVE state.

The network may unicast the UE-specific SDT configuration (e.g., supported SDT types, SDT priority, UE-specific SDT threshold, UE-specific SDT_RSRP threshold, CG-based SDT configuration, DL assignment configuration for SDT, SDT ran-PagingCycle, I-RNTI, release cause for SDT, etc.) via RRC signaling (e.g., RRCRelease) for dedicated SDT within UE(s). The dedicated SDT UL grant is a dedicated resource between one or more UEs belong to RRC_INACTIVE state. The UE may use UE-specific SDT configuration if configured, otherwise, apply the common SDT configuration.

For common/UE-specific SDT configuration transmitted in system information, the network can configure the support of SDT types such as 2-step RACH based SDT, 4-step RACH based SDT, and CG based SDT. SDT priority is used to differentiate the transmission priority of SDT. The common/UE-specific SDT search spaces are indicated to those SDT supported UEs and in which common/UE-specific PDCCHs that schedule the associated shared/dedicated UL SDT grant are allocated. Common SDT threshold is used for the UE to determine whether CG-SDT procedure is to be applied to the shared SDT UL grant. Common SDT_RSRP threshold is used for the UE to determine whether to perform activation of the shared SDT UL grant in RRC_INACTIVE state. SDT Paging configuration and search space is used for the RRC SDT response and time alignment during SDT. The paging occasion, paging cycle, and paging cause/access type are configured for SDT in RRC_INACTIVE state. In some cases, the associated DL SDT are multiplexed with the SDT Paging message on PDSCH. Then the UE decodes the content (e.g., paging cause, access type) of the SDT paging message to perform the associated SDT procedure.

RACH-based SDT configuration includes configuration of common/UE-specific random access parameters which the UE uses for contention-based and contention-free RACH based SDT procedure in RRC_INACTIVE state. SDT PRACH configuration indicates the specific preamble index/groups used for contention-based and contention-free RACH based SDT procedure in RRC_INACTIVE state. In some cases, the specific preamble group(s) for SDT in RRC_INACTIVE can be used to inform the network for the subsequent SDT in RRC_INACTIVE so that the subsequent UL grant of SDT can be allocated/activated. In other cases, the specific preamble group(s) for SDT in RRC_INACTIVE can be used to inform the network the associated amount of SDT data volume or SDT traffic statistics/pattern when SDT threshold is not configured for RACH-based SDT. For UE, if the specific preamble group(s) is configured for SDT in RRC_INACTIVE and if the UE expects the subsequent SDT or the amount of SDT data volume needs for further transmitted, the specific preamble group(s) would be selected. Then the subsequent UL grant can be allocated/activated for subsequent SDT in RRC_INACTIVE.

For UE-specific SDT configuration transmitted in RRC signaling, the network may configure the support of SDT types such as 2-step RACH based SDT, 4-step RACH based SDT, and CG based SDT. SDT priority is used to differentiate the transmission priority of SDT in RRC_INACTIVE. UE-specific SDT threshold is used for the UE to determine whether CG-SDT procedure is to be applied to the dedicated SDT UL grant. UE-specific SDT_RSRP threshold is used for the UE to determine whether to perform activation of the dedicated SDT UL grant in RRC_INACTIVE state. CG-based SDT configuration includes CG resource allocation and periodicity for single or multiple SDT in RRC_INACTIVE state. DL assignment configuration for SDT is configured in response to the associated CG-based UL SDT so that the UE decodes the corresponding PDCCH and PDSCH. SDT ran-PagingCycle indicates the UE specific cycle for SDT paging in RRC_INACTIVE state. SDT paging is neither RAN-specific nor CN-specific, whereas a cell-specific with lower paging overhead. Furthermore, an I-RNTI can be allocated to the UE when it is moving from RRC_CONNECTED to RRC_INACTIVE as part of suspendConfig and identified the UE during RRC_INACTIVE state. The release cause for SDT indicates the network is expected to receive SDT in RRC_INACTIVE state due to power consumption consideration for the UE.

From UE's point of view, the UL small data can be transmitted to the network in RRC_INACTIVE state via the SDT procedure(s). The SDT threshold transmitted in system information or some other RRC configuration messages is used for the UE to determine which type of SDT procedures is applied. On the other hand, when the channel quality is lower than the SDT_RSRP threshold, the SDT procedure should be deactivated and transit to RRC_CONNECTED state for normal data transmission procedure. When the data volume of the UE is larger than the SDT threshold, the UE will transit to the RRC_CONNECTED state for normal data transmission procedure. In some cases (e.g., a burst data arriving such as a picture, a periodic data reporting such as positioning report), those subsequent UL/DL small data transmission following initial UL SDT without transitioning to RRC_CONNECTED state shall be supported.

When 2-step RACH based SDT is applied according to SDT threshold, preamble, RRC SDT request (e.g., RRCResumeRequest) and UL small data packet are multiplexing in MSGA. RRC SDT response (e.g., RRCRelease, SDT Paging) and optional DL small data packet may be multiplexing in MSGB. The subsequent UL/DL small data can be transmitted following MSGA/MSGB. The inactive UE may perform a fallback 4-step RACH based SDT once the transmission of MSGA is failed. When 4-step RACH based SDT is applied according to SDT threshold, RRC SDT request (e.g., RRCResumeRequest) and UL small data packet are multiplexing in MSG3. RRC SDT response (e.g., RRCRelease, SDT Paging) and optional DL small data packet may be multiplexing in MSG4. The subsequent UL/DL small data can be transmitted following MSG3/MSG4. When CG based SDT is applied according to SDT threshold, the configured grant resource is dedicated to the inactive UE for UL small data transmission. The optional DL small data packet may be multiplexing with RRC SDT response (e.g., RRCRelease, SDT Paging) to the inactive UE in response to UL data transmission.

For UL time alignment, SDT Timing Advanced command and SDT Timing Alignment Timer should be maintained in RRC_INACTIVE state to ensure SDT success. For subsequent SDT, there should be a subsequent SDT indication transmitting/multiplexing with PUCCH or PUSCH resources in RACH-based SDT or in CG-based SDT.

In some embodiments, the TAT is restarted upon reception of a TA command in the RRC_INACTIVE state. In some cases, the TA command is carried by Media Access Control (MAC) Control Element (CE). In some cases, the TA command is transmitted along with a RRC (e.g., SDT paging) message. In some cases, the TA command is included in random access response (RAR) message from the network. For example, the TA command is included in MSGB of a 2-step Random Access Channel (RACH) SDT or MSG2 of a 4-step RACH SDT. In some embodiments, the TA command is multiplexed with downlink (DL) data. In some embodiments, the reception of the TA command in the RRC_INACTIVE state is carried out by: transmitting a subsequent SDT indication for requesting time alignment; and receiving the TA command which is in response to the subsequent SDT indication. In some embodiments, the first TA Command or the second TA Command is a SDT TA command specified for SDT in the RRC_INACTIVE state. In some cases, the TAT is a SDT TAT specified for SDT in the RRC_INACTIVE state. In some embodiments, the TAT is associated with one or more Timing Advance Groups (TAGs).

More specifically, a SDT Timing Advance Command MAC CE can be generated and multiplexed with MAC SDU in a MAC PDU by a RRC (e.g., SDT Paging) message if the timing advance command in RRC_INACTIVE should be updated. Then the UE can apply the Timing Advance Command during SDT in RRC_INACTIVE state. A SDT Timing Alignment Timer or a legacy Timing Alignment Timer can be started or restarted upon the reception of the SDT Timing Advance Command MAC CE for keeping UL time alignment during SDT in RRC_INACTIVE state.

The SDT Timing Advance Command MAC CE can be identified by MAC subheader with a new LCID as shown in FIG. 4 or reused LCID of legacy Timing Advance Command MAC CE. In FIG. 4A, a new SDT Timing Advance Command MAC CE is proposed. If there is only the PCell/pTAG (Primary Timing Advance Group) can be maintained during SDT in RRC_INACTIVE state, FIG. 4A is the command from the network to the UE for adjusting UL time alignment in RRC_INACTIVE state. It has a fixed size and consists of one octet defined as follows.

R: Reserved bit(s) for byte alignment if necessary

SDT Timing Advanced command: This field indicates the index value to control the amount of timing adjustment that UE needs to apply during SDT in RRC_INACTIVE state.

On the other hand, FIG. 4B is a new SDT Timing Advance Command MAC CE proposed to support more than one TAG should be maintained during SDT in RRC_INACTIVE state within carrier aggregation (CA) scenario. FIG. 4B is the command from the network to the UE for adjusting UL time alignment in RRC_INACTIVE state. It has a fixed size and consists of one octet defined as follows.

TAG ID (identity): This field indicates the TAG ID of the associated TAG during SDT in RRC_INACTIVE state SDT Timing Advanced command: This field indicates the index value to control the amount of timing adjustment that UE needs to apply during SDT in RRC_INACTIVE state.

Except for SDT Timing Advance Command included in a Random Access Response message for RACH-based SDT in RRC_INACTIVE state, the SDT Timing Advance Command MAC CE can be transmitted along with MAC header of RRC message (e.g., RRCRelease) in RRC_CONNECTED state and/or transmitted along with MAC header of RRC message (e.g., RRCRelease, SDT Paging) in RRC_INACTIVE state.

In some embodiments, the method may include transmitting a subsequent SDT indication to the network to indicate whether the subsequent SDT is waiting to be transmitted to the network or not. In some embodiments, the method may include transmitting a subsequent SDT indication to the network to indicate how much amount of data to be transmitted to the network. In some embodiments, the method may include transmitting a subsequent SDT indication to the network to indicate termination of SDT. In some embodiments, the method may include transmitting a subsequent SDT indication to the network to indicate a SDT type that is willing to use for subsequent SDT. In some embodiments, the method may include transmitting a subsequent SDT indication to the network for requesting the TAT to be restarted in the RRC_INACTIVE state.

More specifically, the subsequent SDT indication is transmitted to indicate there are at least some of SDT is waiting to be transmitted to the network and/or after transmitting the buffer status report. In some cases, the transmission of buffer status report in RRC_INACTIVE is not necessary since the configured UL grant resource is controlled by the network. The network only needs to determine whether to allocate resources for the subsequent SDT or not. The subsequent SDT indication may be at least one bit included in a control information (e.g., subsequent SDT MAC CE as specified in FIG. 5), a periodic/non-periodic set of PUCCH resources on the initial/default BWP or across different BWPs, a tail bit in data payload, or piggyback with SDT. In some cases, the subsequent SDT indication is included in MSGA of a 2-step RACH SDT or MSG3 of a 4-step RACH SDT.

Here, the subsequent SDT MAC CE is identified by MAC subheader with a new LCID and is designed at least one of the following. The subsequent SDT MAC CE is fixed size and consists of one or more subsequent SDT indication field(s) defined as follows. In FIG. 5A, the UE can indicate willing subsequent SDT in RRC_INACTIVE state. After the transmission of the subsequent SDT MAC CE, the UE shall monitor SDT-RNTI search space for subsequent UL and DL scheduling from the network. The format is designed as follows.

SDT-RNTI: the SDT-RNTI field indicates a unique identification used to identify the particular UE(s) during SDT in RRC_INACTIVE. In some cases, the SDT-RNTI may be the C-RNTI or I-RNTI if needed.

Subsequent SDT indication: The Subsequent SDT indication field may indicate whether the subsequent SDT is waiting to be transmitted to the network or not. If the UL grant size per SDT is fixed and configured by the network, the field may indicate how much amount of data to be transmitted so that the network can determine to allocated/activate multiple SDT resources for the UE(s). Furthermore, if the SDT resource is dedicated to a UE, the field may indicate the termination of SDT so that the network may deactivate the SDT resource for the UE. On the other hand, if the total amount of data to be transmitted is not indicated in the field, the field may indicate which SDT type (e.g., RACH-based, periodic CG-based, one-shot CG-based) is willing to use for the subsequent SDT so that the network can determine the potential size/traffic type of subsequent SDT.

In FIG. 5B and FIG. 5C, the UE can indicate willing subsequent SDT in RRC_INACTIVE state by Logical Channel Group (LCG)-based so that the network can determine the priority of the subsequent SDT by the Logical Channel Prioritization (LCP). FIG. 5B is designed to report the subsequent SDT indication of specific LCG(s), whereas FIG. 5C is designed to report the subsequent SDT indication of the associated LCG. The format is designed as follows.

R: Reserved bit(s) for byte alignment if necessary.

LCG ID: The Logical Channel Group ID field identifies the group of logical channel(s) whose subsequent SDT is waiting to transmit.

$LCG_i$: The $LCG_i$ field indicates the presence of the subsequent SDT indication for the logical channel group i.

Subsequent SDT indication: The Subsequent SDT indication field may indicate whether the subsequent SDT is waiting to be transmitted to the network or not. If the UL grant size per SDT is fixed and configured by the network, the field may indicate how much amount of data to be transmitted so that the network can determine to allocated/activate multiple SDT resources for the UE(s). Furthermore, if the SDT resource is dedicated to a UE, the field may indicate the termination of SDT so that the network may deactivate the SDT resource for the UE. On the other hand, it the total amount of data to be transmitted is not indicated in the field, the field may indicate which SDT type (e.g., RACH-based, periodic CG-based, one-shot CG-based) is willing to use for the subsequent SDT so that the network can determine the potential size of subsequent SDT.

$SDT_i$: The $SDT_i$ field indicates the associated subsequent SDT indication with the presence of $LCG_i$. The Subsequent SDT indication is defined as the above mentioned.

In FIG. 5D and FIG. 5E, the UE can indicate willing subsequent SDT in RRC_INACTIVE state by Timing Advance Group (TAG)-based. In general, if SDT in RRC_INACTIVE state only supports to transmit on Primary Timing Advance Group (pTAG), the UE only needs to maintain UL time alignment on pTAG. Then the SDT Timing Alignment Timer of pTAG shall be maintain by the network and the UE. When the subsequent SDT MAC CE is transmitted by the UE, it may indicated the network to update the Timing Advance Command for the subsequent SDT. The network may reply the SDT Timing Advance Command MAC CE for the UE and may activate the subsequent CG-based SDT resource as well.

On the other hand, if CA duplication is supported to SDT in RRC_INACTIVE state, the Timing Alignment Timer of Secondary Timing Advance Group (sTAG) shall be maintained by the network and the UE. This format can support more than one TAG that should be maintained. FIG. 5D is designed to report the subsequent SDT indication of specific TAGs), whereas FIG. 5E is designed to report the subsequent SDT indication of the associated TAG. The format is designed as follows.

TAG Identity (TAG ID): The Timing Advance Group ID field identifies the TAG(s) whose subsequent SDT is waiting to transmit.

TAGj: The TAG, field indicates the presence of the subsequent SDT indication for the Timing Advance Group j.

Subsequent SDT indication: The Subsequent SDT indication field may indicate whether the subsequent SDT is waiting to be transmitted to the network or not. If the UL grant size per SDT is fixed and configured by the network, the field may indicate how much amount of data to be transmitted so that the network can determine to allocated/activate multiple SDT resources for the UE(s). Furthermore, if the SDT resource is dedicated to a UE, the field may indicate the termination of SDT so that the network may deactivate the SDT resource for the UE. On the other hand, if the total amount of data to be transmitted is not indicated in the field, the field may indicate which SDT type (e.g., RACH-based, periodic CG-based, one-shot CG-based) is willing to use for the subsequent SDT so that the network can determine the potential size/traffic type of subsequent SDT.

$SDT_j$: The $SDT_j$ field indicates the associated subsequent SDT indication with the presence of $TAG_j$. The Subsequent SDT indication is defined as the above mentioned.

Figure 6:
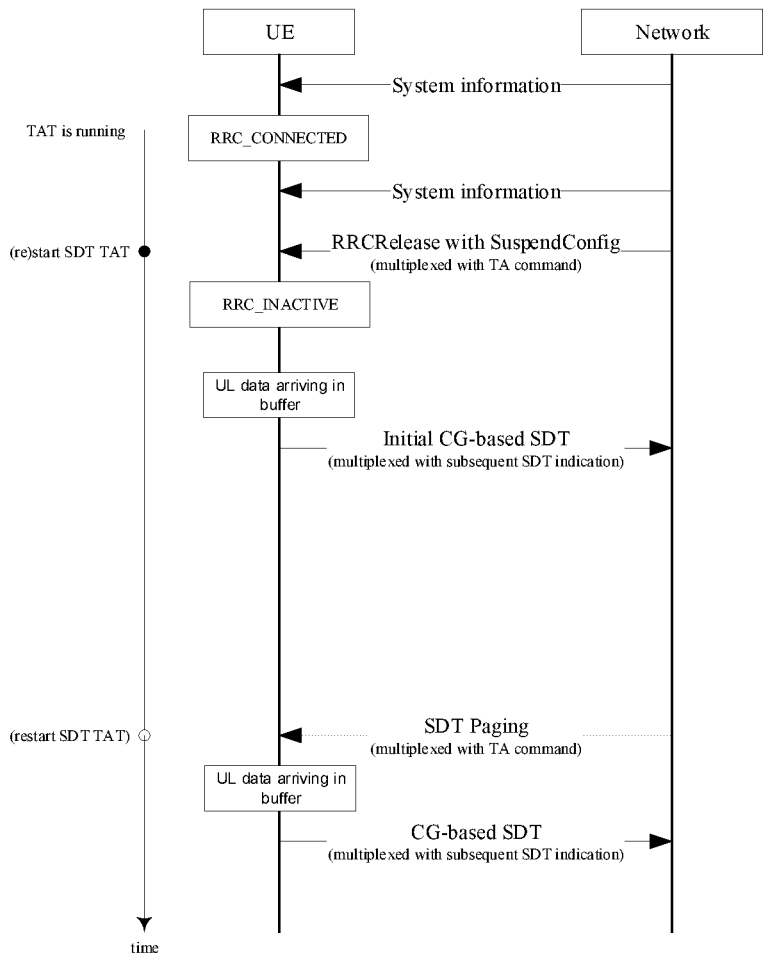
FIG. 6 is a flowchart of a method for SDT in RRC_INACTIVE state according to a first embodiment of the present disclosure.

FIG. 6 is a flowchart of a method for SDT in RRC_INACTIVE state according to a first embodiment of the present disclosure.

In FIG. 6, for a network supporting SDT in RRC_INACTIVE state, the common/UE-specific SDT configuration is transmitted in system information as specified the above. The network may broadcast/unicast the common/UE-specific SDT configuration (e.g., supported SDT types, SDT priority, common/UE-specific SDT search space, common SDT threshold, common SDT_RSRP threshold, SDT Paging configuration and search space, RACH-based SDT configuration, SDT PRACH configuration, etc.) via system information (e.g., SIB2, on-demand SI) for shared SDT UL grant within UEs. Some of UE-specific SDT configuration is transmitted in RRC signaling as specified the above. The network may unicast the UE-specific SDT configuration (e.g., supported SDT types, SDT priority, UE-specific SDT threshold, UE-specific SDT_RSRP threshold, CG-based SDT configuration, DL assignment configuration for SDT, SDT ran-PagingCycle, I-RNTI, release cause for SDT, etc.) via RRC signaling (e.g., RRCRelease) for dedicated SDT within UE(s). In FIG. 6, the RRCRelease including suspendConfig and UE-specific SDT configuration is transmitted by the network to suspend the RRC connection, the UE shall apply the received suspendConfig and UE-specific SDT configuration. The MAC entity is reset and accordingly Timing Alignment Timer associated with the TAG(s) is stopped or to be expired. The SDT Timing Advance Command MAC CE as specified in FIG. 4 can be transmitted along with MAC header of RRCRelease. Then the UE can apply the SDT Timing Advance Command upon the reception of RRCRelease. The SDT Timing Alignment Timer can be started or restarted for keeping UL time alignment during SDT in RRC_INACTIVE state. In some case, the legacy Timing Alignment Timer associated with the TAG(s) is restarted upon the reception of SDT Timing Advance Command MAC CE. After entering RRC_INACTIVE state and UL data arriving in UE TX buffer, the initial CG-based UL SDT is transmitted to the network while SDT Timing Alignment Timer is running. In this embodiment, the one-shot CG-based SDT type is indicated in the subsequent SDT indication transmitted/multiplexed with initial UL CG-based SDT. The subsequent SDT indication may be at least one bit included in a control information (e.g., subsequent SDT MAC CE as specified in FIG. 5), a periodic/non-periodic set of PUCCH resources on the initial/default BWP or across different BWPs, a tail bit in data payload, or piggyback with SDT. The network can determine whether to deactivate the allocated SDT resources for the UE and maintain the SDT Timing Alignment Timer for the UE by using SDT paging as specified in FIG. 4, if necessary (shown as dashed line). The SDT Timing Alignment Timer can be restarted upon the reception of SDT Timing Advance Command. When there is a new data arriving in UE TX buffer, CG-based SDT can be operated during RRC_INACTIVE state upon the maintenance of UL synchronization/time alignment.

Figure 7:
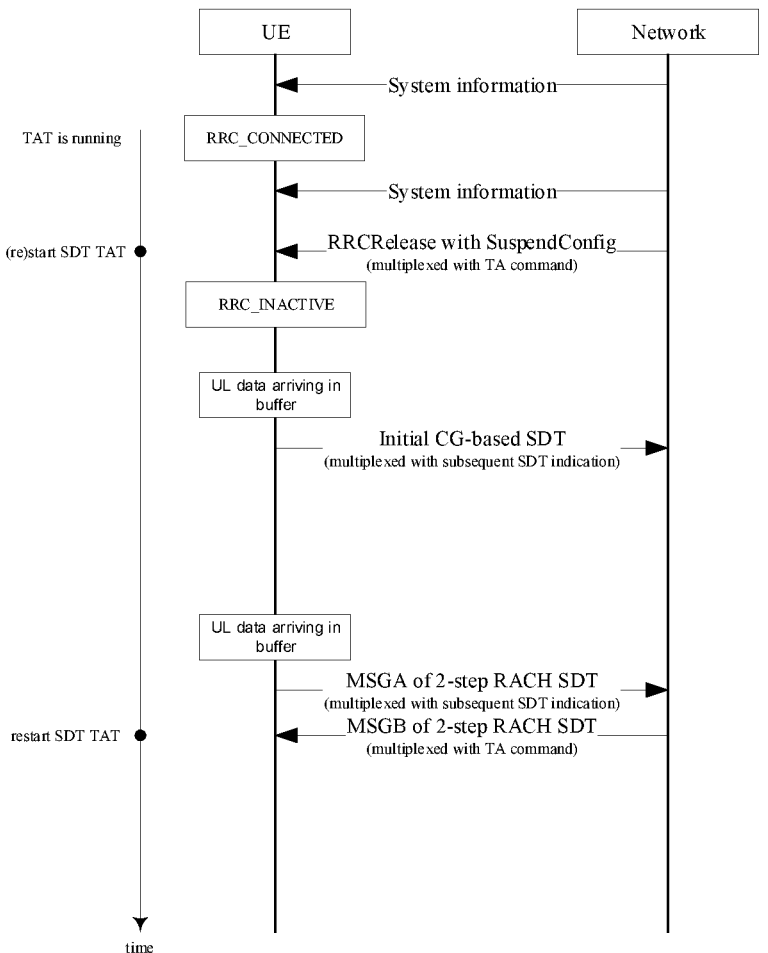
FIG. 7 is a flowchart of a method for SDT in RRC_INACTIVE state according to a second embodiment of the present disclosure.

FIG. 7 is a flowchart of a method for SDT in RRC_I-NACTIVE state according to a second embodiment of the present disclosure.

In FIG. 7, for a network supporting SDT in RRC_INAC-TIVE state, the common/UE-specific SDT configuration is transmitted in system information as specified the above. The network may broadcast/unicast the common/UE-specific SDT configuration (e.g., supported SDT types, SDT priority, common/UE-specific SDT search space, common SDT threshold, common SDT_RSRP threshold, SDT Paging configuration and search space, RACH-based SDT configu-ration, SDT PRACH configuration, etc.) via system infor-mation (e.g., SIB2, on-demand SI) for shared SDT UL grant within UEs. Some of UE-specific SDT configuration is transmitted in RRC signaling as specified the above. The network may unicast the UE-specific SDT configuration (e.g., supported SDT types, SDT priority, UE-specific SDT threshold, UE-specific SDT_RSRP threshold, CG-based SDT configuration, DL assignment configuration for SDT, SDT ran-PagingCycle, I-RNTI, release cause for SDT, etc.) via RRC signaling (e.g., RRCRelease) for dedicated SDT within UE(s). In FIG. 7, the RRCRelease including suspend-Config and UE-specific SDT configuration is transmitted by the network to suspend the RRC connection, the UE shall apply the received suspendConfig and UE-specific SDT configuration. The MAC entity is reset and accordingly Timing Alignment Timer associated with the TAG(s) is stopped or to be expired. The SDT Timing Advance Com-mand MAC CE as specified in FIG. 4 can be transmitted along with MAC header of RRCRelease. Then the UE can apply the SDT Timing Advance Command upon the recep-tion of RRCRelease. The SDT Timing Alignment Timer can be started or restarted for keeping UL time alignment during SDT in RRC_INACTIVE state. In some case, the legacy Timing Alignment Timer associated with the TAG(s) is restarted upon the reception of SDT Timing Advance Com-mand MAC CE. After entering RRC_INACTIVE state and UL data arriving in UE TX buffer, the initial CG-based UL SDT is transmitted to the network while SDT Timing Alignment Timer is running. In this embodiment, the one-shot CG-based SDT type is indicated in the subsequent SDT indication transmitted/multiplexed with initial UL CG-based SDT. The subsequent SDT indication may be at least one bit included in a control information (e.g., subsequent SDT MAC CE as specified in FIG. 5), a periodic/non-periodic set of PUCCH resources on the initial/default BWP or across different BWPs, a tail bit in data payload, or piggyback with SDT. The network can determine whether to deactivate the allocated SDT resources for the UE and maintain the SDT Timing Alignment Timer for the UE by using SDT paging as specified in FIG. 4, if necessary (not shown in FIG. 7). After a period, if the UE does not receive any SDT Timing Advance Command MAC CE from the network for some reasons (e.g., missing SDT paging) and there is a new data arriving in UE TX buffer, the UE may initiate the 2-step or 4-step RACH-based SDT based on SDT threshold. If the UE determine to initiate the 2-step RACH-based SDT, the UL and optional DL small data is transmitted on the MSGA and MSGB respectively. Furthermore, the MSGA may contain RRCResumeRequest multiplexed with subsequent SDT indication, and MSGB contains RRCRelease multiplexed SDT Timing Advance Command MAC CE. The SDT Tim-ing Alignment Timer is started or restarted upon the recep-tion of SDT Timing Advance Command included in the MSGB. If the UE determine to initiate the 4-step RACH-based SDT (not shown in FIG. 7), The UL and DL small data is transmitted on the MSG3 and MSG4 respectively. Fur-thermore, the MSG3 may contain RRCResumeRequest mul-tiplexed with subsequent SDT indication, and MSG4 con-tains RRCRelease multiplexed DL data, if necessary. The SDT Timing Alignment Timer is restarted upon the recep-tion of SDT Timing Advance Command included in the MSG2. In this embodiment, The SDT Timing Alignment Timer can be maintained by MSGB or MSG2 in addition to SDT paging in RRC_INACTIVE state.

Figure 8:
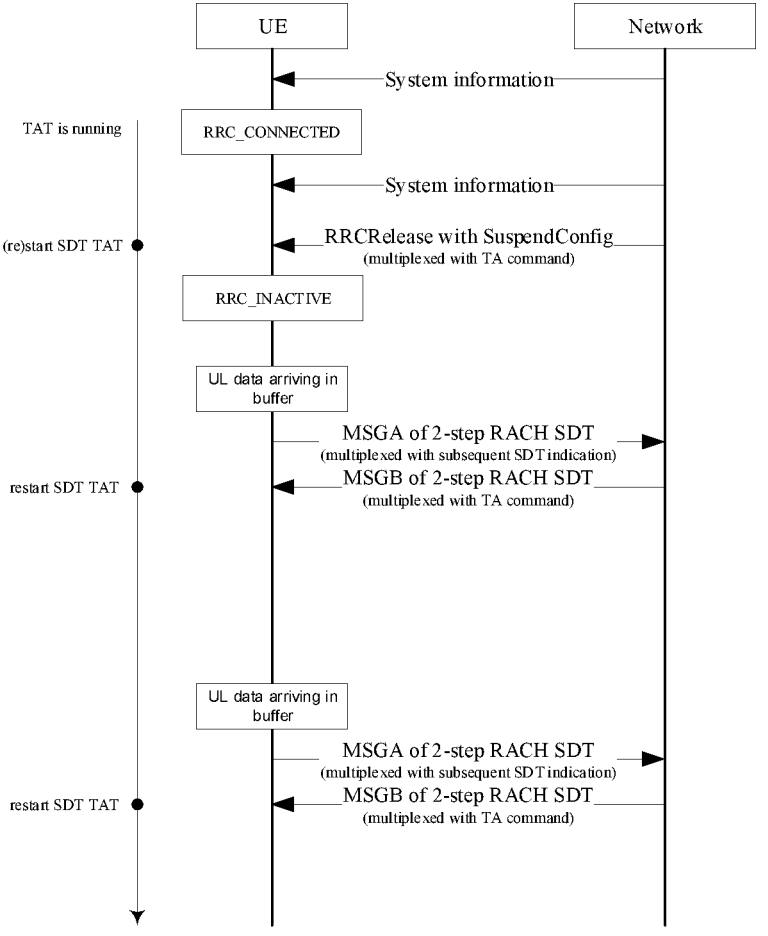
FIG. 8 is a flowchart of a method for SDT in RRC_INACTIVE state according to a third embodiment of the present disclosure.

FIG. 8 is a flowchart of a method for SDT in RRC_I-NACTIVE state according to a third embodiment of the present disclosure.

In FIG. 8, for a network supporting SDT in RRC_INAC-TIVE state, the common/UE-specific SDT configuration is transmitted in system information as specified the above. The network may broadcast/unicast the common/UE-spe-cific SDT configuration (e.g., supported SDT types, SDT priority, common/UE-specific SDT search space, common SDT threshold, common SDT_RSRP threshold, SDT Paging configuration and search space, RACH-based SDT configu-ration, SDT PRACH configuration, etc.) via system infor-mation (e.g., SIB2, on-demand SI) for shared SDT UL grant within UEs. Some of UE-specific SDT configuration is transmitted in RRC signaling as specified the above. The network may unicast the UE-specific SDT configuration (e.g., supported SDT types, SDT priority, UE-specific SDT threshold, UE-specific SDT_RSRP threshold, CG-based SDT configuration, DL assignment configuration for SDT, SDT ran-PagingCycle, I-RNTI, release cause for SDT, etc.) via RRC signaling (e.g., RRCRelease) for dedicated SDT within UE(s). In FIG. 8, the RRCRelease including suspend-Config and UE-specific SDT configuration is transmitted by the network to suspend the RRC connection, the UE shall apply the received suspendConfig and UE-specific SDT configuration. The MAC entity is reset and accordingly Timing Alignment Timer associated with the TAG(s) is stopped or to be expired. The SDT Timing Advance Com-mand MAC CE as specified in FIG. 4 can be transmitted along with MAC header of RRCRelease. Then the UE can apply the SDT Timing Advance Command upon the recep-tion of RRCRelease. The SDT Timing Alignment Timer can be started or restarted for keeping UL time alignment during SDT in RRC_INACTIVE state. In some case, the legacy Timing Alignment Timer associated with the TAG(s) is restarted upon the reception of SDT Timing Advance Com-mand MAC CE. After entering RRC_INACTIVE state and initial UL data arriving in UE TX buffer, the UE may initiate the 2-step or 4-step RACH-based SDT based on SDT threshold no matter SDT Timing Alignment Timer is running. If the UE determine to initiate the 2-step RACH-based SDT, the UL and optional DL small data is transmitted on the MSGA and MSGB respectively. Furthermore, the MSGA may contain RRCResumeRequest multiplexed with subsequent SDT indication, and MSGB contains RRCRelease multiplexed SDT Timing Advance Command MAC CE. The SDT Timing Alignment Timer is started or restarted upon the reception of SDT Timing Advance Command included in the MSGB. If the UE determine to initiate the 4-step RACH-based SDT (not shown in FIG. 8), The UL and DL small data is transmitted on the MSG3 and MSG4 respectively. Furthermore, the MSG3 may contain RRCResumeRequest multiplexed with subsequent SDT indication, and MSG4 contains RRCRelease multiplexed DL data, if necessary. The SDT Timing Alignment Timer is restarted upon the reception of SDT Timing Advance Command included in the MSG2. After that, if there is a new data arriving in UE TX buffer, the UE determine the CG-based (not shown in FIG. 8), 2-step or 4-step RACH-based SDT based on SDT threshold while SDT Timing Alignment Timer is running.

Figure 9:
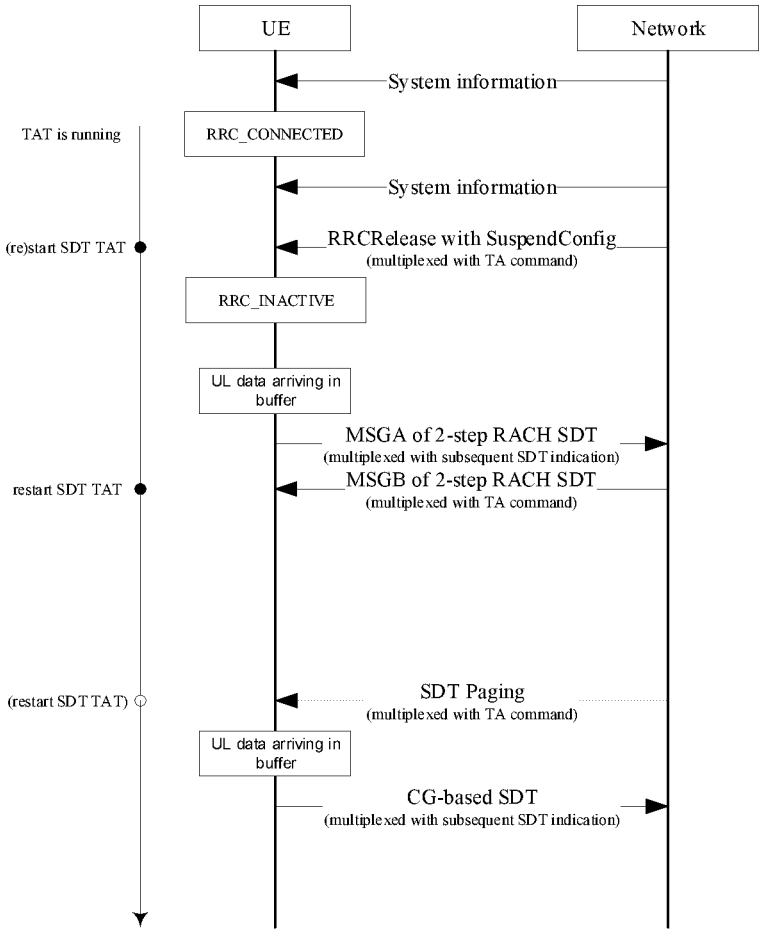
FIG. 9 is a flowchart of a method for SDT in RRC_INACTIVE state according to a fourth embodiment of the present disclosure.

FIG. 9 is a flowchart of a method for SDT in RRC_INACTIVE state according to a fourth embodiment of the present disclosure.

In FIG. 9, for a network supporting SDT in RRC_INACTIVE state, the common/UE-specific SDT configuration is transmitted in system information as specified the above. The network may broadcast/unicast the common/UE-specific SDT configuration (e.g., supported SDT types, SDT priority, common/UE-specific SDT search space, common SDT threshold, common SDT_RSRP threshold, SDT Paging configuration and search space, RACH-based SDT configuration, SDT PRACH configuration, etc.) via system information (e.g., SIB2, on-demand SI) for shared SDT UL grant within UEs. Some of UE-specific SDT configuration is transmitted in RRC signaling as specified the above. The network may unicast the UE-specific SDT configuration (e.g., supported SDT types, SDT priority, UE-specific SDT threshold, UE-specific SDT_RSRP threshold, CG-based SDT configuration, DL assignment configuration for SDT, SDT ran-PagingCycle, I-RNTI, release cause for SDT, etc.) via RRC signaling (e.g., RRCRelease) for dedicated SDT within UE(s). In FIG. 9, the RRCRelease including suspendConfig and UE-specific SDT configuration is transmitted by the network to suspend the RRC connection, the UE shall apply the received suspendConfig and UE-specific SDT configuration. The MAC entity is reset and accordingly Timing Alignment Timer associated with the TAG(s) is stopped or to be expired. The SDT Timing Advance Command MAC CE as specified in FIG. 4 can be transmitted along with MAC header of RRCRelease. Then the UE can apply the SDT Timing Advance Command upon the reception of RRCRelease. The SDT Timing Alignment Timer can be started or restarted for keeping UL time alignment during SDT in RRC_INACTIVE state. In some case, the legacy Timing Alignment Timer associated with the TAG(s) is restarted upon the reception of SDT Timing Advance Command MAC CE. After entering RRC_INACTIVE state and initial UL data arriving in UE TX buffer, the UE may initiate the 2-step or 4-step RACH-based SDT based on SDT threshold no matter SDT Timing Alignment Timer is running. If the UE determine to initiate the 2-step RACH-based SDT, the UL and optional DL small data is transmitted on the MSGA and MSGB respectively. Furthermore, the MSGA may contain RRCResumeRequest multiplexed with subsequent SDT indication, and MSGB contains RRCRelease multiplexed SDT Timing Advance Command MAC CE. The SDT Timing Alignment Timer is started or restarted upon the reception of SDT Timing Advance Command included in the MSGB. If the UE determine to initiate the 4-step RACH-based SDT (not shown in FIG. 9), The UL and DL small data is transmitted on the MSG3 and MSG4 respectively. Furthermore, the MSG3 may contain RRCResumeRequest multiplexed with subsequent SDT indication, and MSG4 contains RRCRelease multiplexed DL data, if necessary. The SDT Timing Alignment Timer is restarted upon the reception of SDT Timing Advance Command included in the MSG2. The network maintains the SDT Timing Alignment Timer for the UE by using SDT paging as specified in FIG. 4, if necessary (shown as dashed line). The SDT Timing Alignment Timer can be restarted upon the reception of SDT Timing Advance Command. When there is a new data arriving in UE TX buffer, the UE determine the CG-based, 2-step or 4-step RACH-based (not shown in FIG. 9) SDT based on SDT threshold while SDT Timing Alignment Timer is running. In some cases, when there is subsequent data or a new data arriving in UE TX buffer, CG-based SDT can be operated during RRC_INACTIVE state upon the maintenance of UL synchronization/time alignment.

Figure 10:
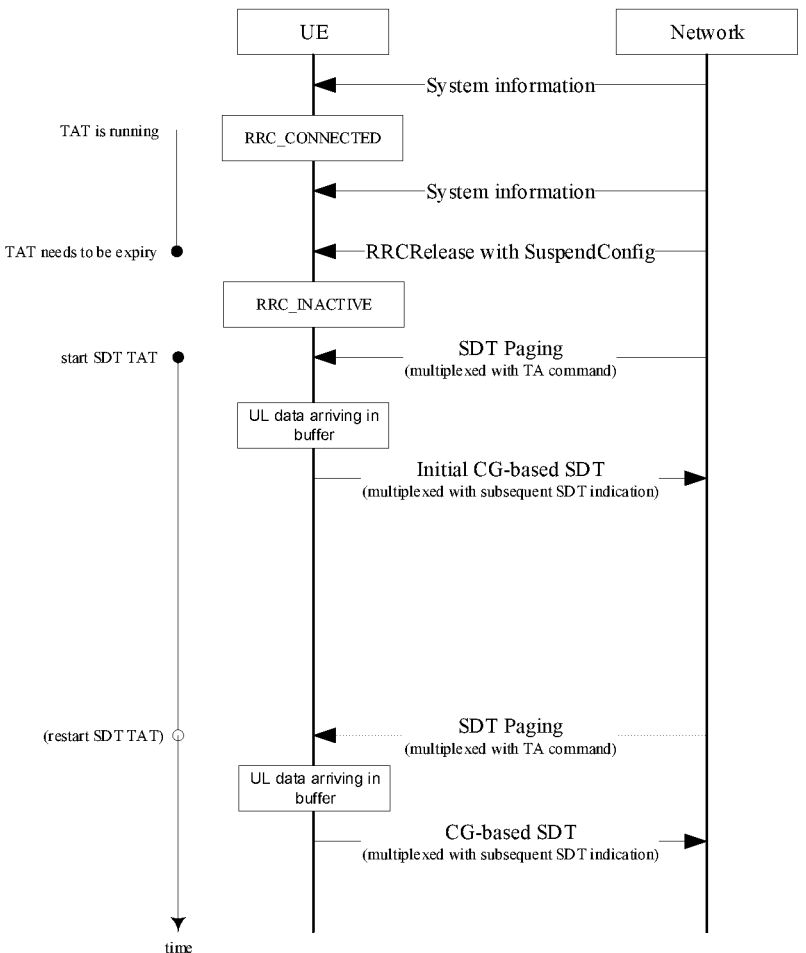
FIG. 10 is a flowchart of a method for SDT in RRC_INACTIVE state according to a fifth embodiment of the present disclosure.

FIG. 10 is a flowchart of a method for SDT in RRC_INACTIVE state according to a fifth embodiment of the present disclosure.

In FIG. 10, for a network supporting SDT in RRC_INACTIVE state, the common/UE-specific SDT configuration is transmitted in system information as specified the above. The network may broadcast/unicast the common/UE-specific SDT configuration (e.g., supported SDT types, SDT priority, common/UE-specific SDT search space, common SDT threshold, common SDT_RSRP threshold, SDT Paging configuration and search space, RACH-based SDT configuration, SDT PRACH configuration, etc.) via system information (e.g., SIB2, on-demand SI) for shared SDT UL grant within UEs. Some of UE-specific SDT configuration is transmitted in RRC signaling as specified the above. The network may unicast the UE-specific SDT configuration (e.g., supported SDT types, SDT priority, UE-specific SDT threshold, UE-specific SDT_RSRP threshold, CG-based SDT configuration, DL assignment configuration for SDT, SDT ran-PagingCycle, I-RNTI, release cause for SDT, etc.) via RRC signaling (e.g., RRCRelease) for dedicated SDT within UE(s). In FIG. 10, the RRCRelease including suspendConfig and UE-specific SDT configuration is transmitted by the network to suspend the RRC connection, the UE shall apply the received suspendConfig and UE-specific SDT configuration. The MAC entity is reset and accordingly Timing Alignment Timer associated with the TAG(s) is stopped or to be expired. After entering RRC_INACTIVE state, a SDT Timing Advance Command MAC CE as specified in FIG. 4 can be transmitted along with MAC header of SDT paging. Then the UE can apply the SDT Timing Advance Command upon the reception of SDT paging. The SDT Timing Alignment Timer can be started for keeping UL time alignment during SDT in RRC_INACTIVE state. When UL data arriving in UE TX buffer, the initial CG-based UL SDT is transmitted to the network while SDT Timing Alignment Timer is running. In other words, CG-based SDT can only be initiated upon the running SDT Timing Alignment Timer. The subsequent SDT indication may be transmitted/multiplexed with initial UL CG-based SDT. The subsequent SDT indication may be at least one bit included in a control information (e.g., subsequent SDT MAC CE as specified in FIG. 5), a periodic/non-periodic set of PUCCH resources on the initial/default BWP or across different BWPs, a tail bit in data payload, or piggyback with SDT. The network can determine whether to deactivate the allocated SDT resources for the UE and maintain the SDT Timing Alignment Timer for the UE by using SDT paging as specified in FIG. 4, if necessary (shown as dashed line). The SDT Timing Alignment Timer can be restarted upon the reception of SDT Timing Advance Command. When there is subsequent data or a new data arriving in UE TX buffer, CG-based SDT can be operated during RRC_INACTIVE state upon the maintenance of UL synchronization/time alignment.

Figure 11:
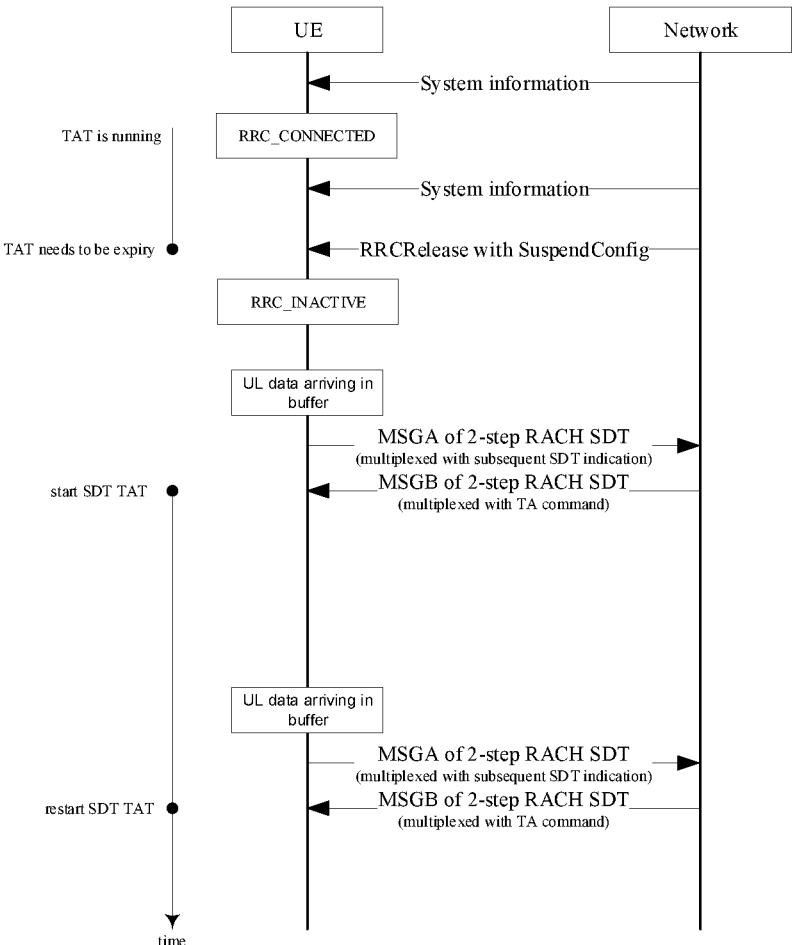
FIG. 11 is a flowchart of a method for SDT in RRC_INACTIVE state according to a sixth embodiment of the present disclosure.

FIG. 11 is a flowchart of a method for SDT in RRC_I-NACTIVE state according to a sixth embodiment of the present disclosure.

In FIG. 11, for a network supporting SDT in RRC_INAC-TIVE state, the common/UE-specific SDT configuration is transmitted in system information as specified the above. The network may broadcast/unicast the common/UE-spe-cific SDT configuration (e.g., supported SDT types, SDT priority, common/UE-specific SDT search space, common SDT threshold, common SDT_RSRP threshold, SDT Paging configuration and search space, RACH-based SDT configu-ration, SDT PRACH configuration, etc.) via system infor-mation (e.g., SIB2, on-demand SI) for shared SDT UL grant within UEs. Some of UE-specific SDT configuration is transmitted in RRC signaling as specified the above. The network may unicast the UE-specific SDT configuration (e.g., supported SDT types, SDT priority, UE-specific SDT threshold, UE-specific SDT_RSRP threshold, CG-based SDT configuration, DL assignment configuration for SDT, SDT ran-PagingCycle, I-RNTI, release cause for SDT, etc.) via RRC signaling (e.g., RRCRelease) for dedicated SDT within UE(s). In FIG. 11, the RRCRelease including sus-pendConfig and UE-specific SDT configuration is transmit-ted by the network to suspend the RRC connection, the UE shall apply the received suspendConfig and UE-specific SDT configuration. The MAC entity is reset and accordingly Timing Alignment Timer associated with the TAG(s) is stopped or to be expired. After entering RRC_INACTIVE state and UL data arriving in UE TX buffer, the UE may initiate the 2-step or 4-step RACH-based SDT based on SDT threshold to trigger SDT Timing Alignment Timer. If the UE determine to initiate the 2-step RACH-based SDT, the UL and optional DL small data is transmitted on the MSGA and MSGB respectively. Furthermore, the MSGA may contain RRCResumeRequest multiplexed with subsequent SDT indication, and MSGB contains RRCRelease multiplexed SDT Timing Advance Command MAC CE. The SDT Tim-ing Alignment Timer is started upon the reception of SDT Timing Advance Command included in the MSGB. If the UE determine to initiate the 4-step RACH-based SDT (not shown in FIG. 11), The UL and DL small data is transmitted on the MSG3 and MSG4 respectively. Furthermore, the MSG3 may contain RRCResumeRequest multiplexed with subsequent SDT indication, and MSG4 contains RRCRe-lease multiplexed DL data, if necessary. The SDT Timing Alignment Timer is started upon the reception of SDT Timing Advance Command included in the MSG2. After that, if there is subsequent data or a new data arriving in UE TX buffer, the UE determine the CG-based, 2-step or 4-step RACH-based SDT based on SDT threshold while SDT Timing Alignment Timer is running. In some cases, when there is a new data arriving in UE TX buffer, CG-based SDT (not shown in FIG. 11) can be operated during RRC_INAC-TIVE state upon the maintenance of UL synchronization/time alignment.

Figure 12:
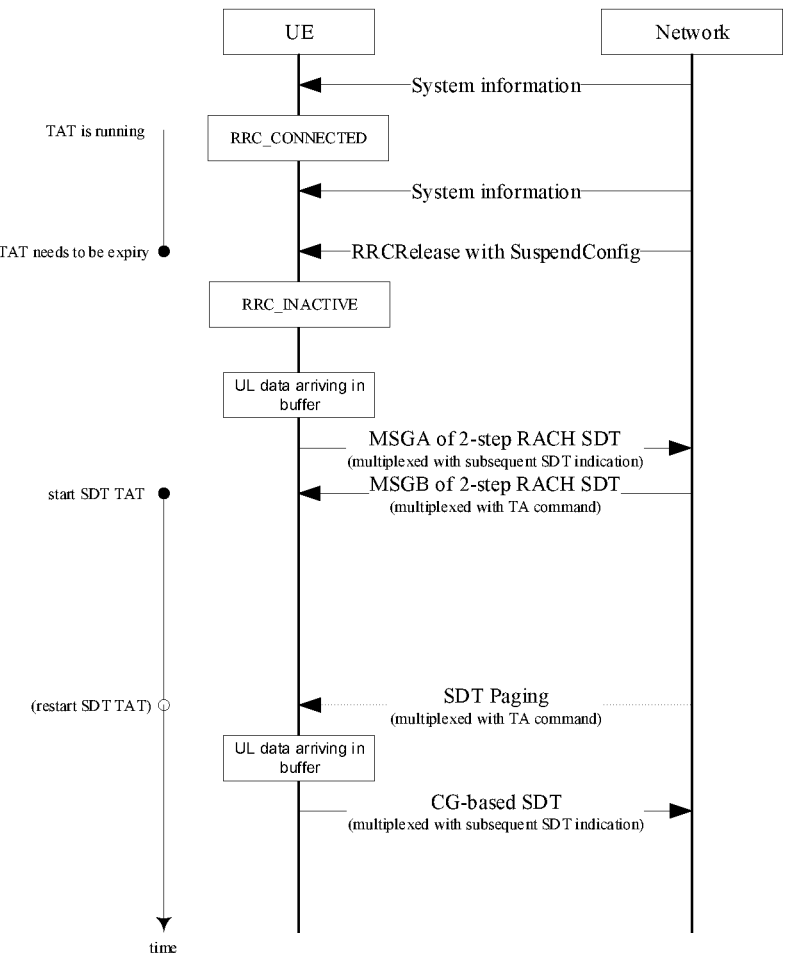
FIG. 12 is a flowchart of a method for SDT in RRC_I-NACTIVE state according to a seventh embodiment of the present disclosure.

FIG. 12 is a flowchart of a method for SDT in RRC_I-NACTIVE state according to a seventh embodiment of the present disclosure.

In FIG. 12, for a network supporting SDT in RRC_INAC-TIVE state, the common/UE-specific SDT configuration is transmitted in system information as specified the above. The network may broadcast/unicast the common/UE-spe-cific SDT configuration (e.g., supported SDT types, SDT priority, common/UE-specific SDT search space, common SDT threshold, common SDT_RSRP threshold, SDT Paging configuration and search space, RACH-based SDT configu-ration, SDT PRACH configuration, etc.) via system infor-mation (e.g., SIB2, on-demand SI) for shared SDT UL grant within UEs. Some of UE-specific SDT configuration is transmitted in RRC signaling as specified the above. The network may unicast the UE-specific SDT configuration (e.g., supported SDT types, SDT priority, UE-specific SDT threshold, UE-specific SDT_RSRP threshold, CG-based SDT configuration, DL assignment configuration for SDT, SDT ran-PagingCycle, I-RNTI, release cause for SDT, etc.) via RRC signaling (e.g., RRCRelease) for dedicated SDT within UE(s). In FIG. 12, the RRCRelease including sus-pendConfig and UE-specific SDT configuration is transmit-ted by the network to suspend the RRC connection, the UE shall apply the received suspendConfig and UE-specific SDT configuration. The MAC entity is reset and accordingly Timing Alignment Timer associated with the TAG(s) is stopped or to be expired. After entering RRC_INACTIVE state and UL data arriving in UE TX buffer, the UE may initiate the 2-step or 4-step RACH-based SDT based on SDT threshold to trigger SDT Timing Alignment Timer. If the UE determine to initiate the 2-step RACH-based SDT, the UL and optional DL small data is transmitted on the MSGA and MSGB respectively. Furthermore, the MSGA may contain RRCResumeRequest multiplexed with subsequent SDT indication, and MSGB contains RRCRelease multiplexed SDT Timing Advance Command MAC CE. The SDT Tim-ing Alignment Timer is started upon the reception of SDT Timing Advance Command included in the MSGB. If the UE determine to initiate the 4-step RACH-based SDT (not shown in FIG. 12), The UL and DL small data is transmitted on the MSG3 and MSG4 respectively. Furthermore, the MSG3 may contain RRCResumeRequest multiplexed with subsequent SDT indication, and MSG4 contains RRCRe-lease multiplexed DL data, if necessary. The SDT Timing Alignment Timer is started upon the reception of SDT Timing Advance Command included in the MSG2. The network maintains the SDT Timing Alignment Timer for the UE by using SDT paging as specified in FIG. 4, if necessary (shown as dashed line). The SDT Timing Alignment Timer can be restarted upon the reception of SDT Timing Advance Command. When there is a new data arriving in UE TX buffer, the UE determine the CG-based, 2-step or 4-step RACH-based (not shown in FIG. 12) SDT based on SDT threshold while SDT Timing Alignment Timer is running. In some cases, when there is subsequent data or a new data arriving in UE TX buffer, CG-based SDT can be operated during RRC_INACTIVE state upon the maintenance of UL synchronization/time alignment.

Figure 13:
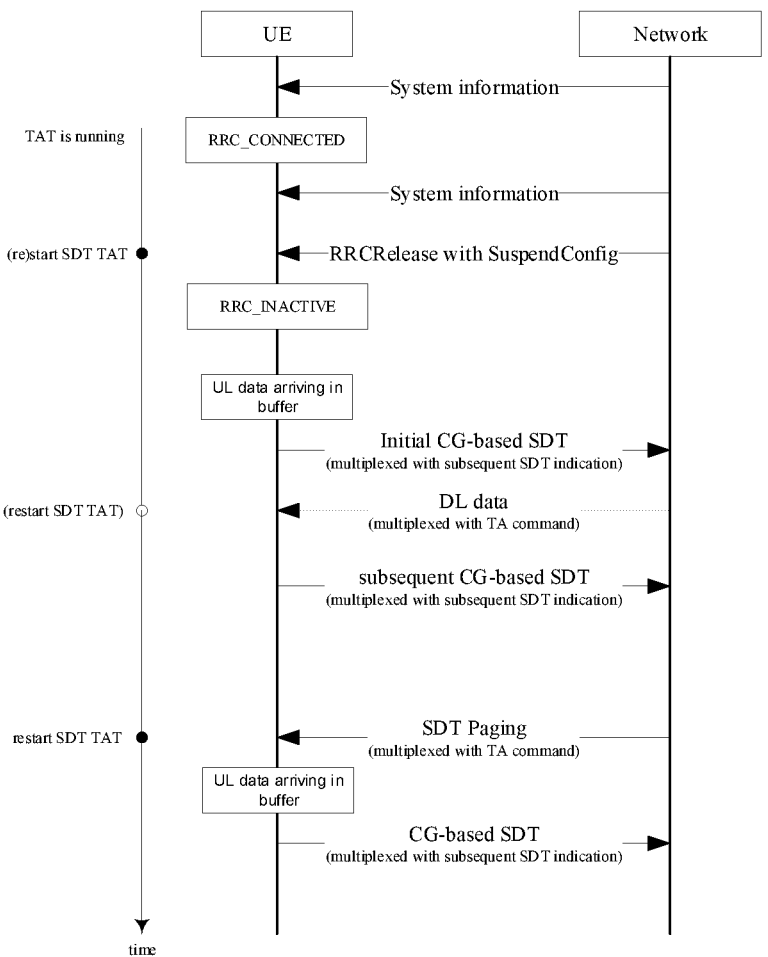
FIG. 13 is a flowchart of a method for SDT in RRC_I-NACTIVE state according to an eighth embodiment of the present disclosure.

FIG. 13 is a flowchart of a method for SDT in RRC_I-NACTIVE state according to an eighth embodiment of the present disclosure.

In FIG. 13, for a network supporting SDT in RRC_INAC-TIVE state, the common/UE-specific SDT configuration is transmitted in system information as specified the above. The network may broadcast/unicast the common/UE-spe-cific SDT configuration (e.g., supported SDT types, SDT priority, common/UE-specific SDT search space, common SDT threshold, common SDT_RSRP threshold, SDT Paging configuration and search space, RACH-based SDT configuration, SDT PRACH configuration, etc.) via system information (e.g., SIB2, on-demand SI) for shared SDT UL grant within UEs. Some of UE-specific SDT configuration is transmitted in RRC signaling as specified the above. The network may unicast the UE-specific SDT configuration (e.g., supported SDT types, SDT priority, UE-specific SDT threshold, UE-specific SDT_RSRP threshold, CG-based SDT configuration, DL assignment configuration for SDT, SDT ran-PagingCycle, I-RNTI, release cause for SDT, etc.) via RRC signaling (e.g., RRCRelease) for dedicated SDT within UE(s). In FIG. 13, the RRCRelease including suspendConfig and UE-specific SDT configuration is transmitted by the network to suspend the RRC connection, the UE shall apply the received suspendConfig and UE-specific SDT configuration. The MAC entity is reset and accordingly Timing Alignment Timer associated with the TAG(s) is stopped or to be expired. The SDT Timing Advance Command MAC CE as specified in FIG. 4 can be transmitted along with MAC header of RRCRelease. Then the UE can apply the SDT Timing Advance Command upon the reception of RRCRelease. The SDT Timing Alignment Timer can be started or restarted for keeping UL time alignment during SDT in RRC_INACTIVE state. In some case, the legacy Timing Alignment Timer associated with the TAG(s) is restarted upon the reception of SDT Timing Advance Command MAC CE. After entering RRC_INACTIVE state and UL data arriving in UE TX buffer, the initial CG-based UL SDT is transmitted to the network while SDT Timing Alignment Timer is running. If necessary, DL data is transmitted on the pre-configured DL assignment resource or multiplexed with the SDT paging message. For subsequent UL SDT, there should be a buffer status report or a subsequent SDT indication transmitted/multiplexed with initial UL CG-based SDT. The subsequent SDT indication may be at least one bit included in a control information (e.g., subsequent SDT MAC CE as specified in FIG. 5), a periodic/non-periodic set of PUCCH resources on the initial/default BWP or across different BWPs, a tail bit in data payload, or piggyback with SDT. The SDT Timing Advance Command MAC CE as specified in FIG. 4 can be replied by MAC header of DL data, and/or multiplexed with SDT Paging if necessary (shown as dashed line). Upon the reception of SDT Timing Advance Command MAC CE, the UE shall apply the SDT Timing Advance Command for the indicated TAG(s) and restart the SDT Timing Alignment Timer for the associated TAG(s) if necessary. In some cases, the subsequent SDT indication may indicate there is further subsequent SDT is waiting to be transmitted to the network and then CG-based SDT is easy to keep working while UL timing alignment is maintained. In some other cases, if the subsequent SDT indication indicates there is no further SDT for transmission over a period, the network can determine whether to deactivate the allocated SDT resources for the UE and maintain the SDT Timing Alignment Timer for the UE by using SDT paging as specified in FIG. 4. If the network determines to maintain the CG-based resource allocation, the CG-based SDT can be transmitted with low latency and low power consumption in RRC_INACTIVE state. If the network determines to deactivate the CG-based resource allocation, the CG-based resource can be deactivated upon the reception of subsequent SDT indication, for example, by PUCCH (not shown). After that in a period, the UE can still perform CG-based SDT while SDT Timing Alignment Timer is running. When the UL synchronization/ time alignment is maintained in RRC_INACTIVE state, CG-based SDT and subsequent CG-based SDT can be operated during RRC_INACTIVE state.

Figure 14:
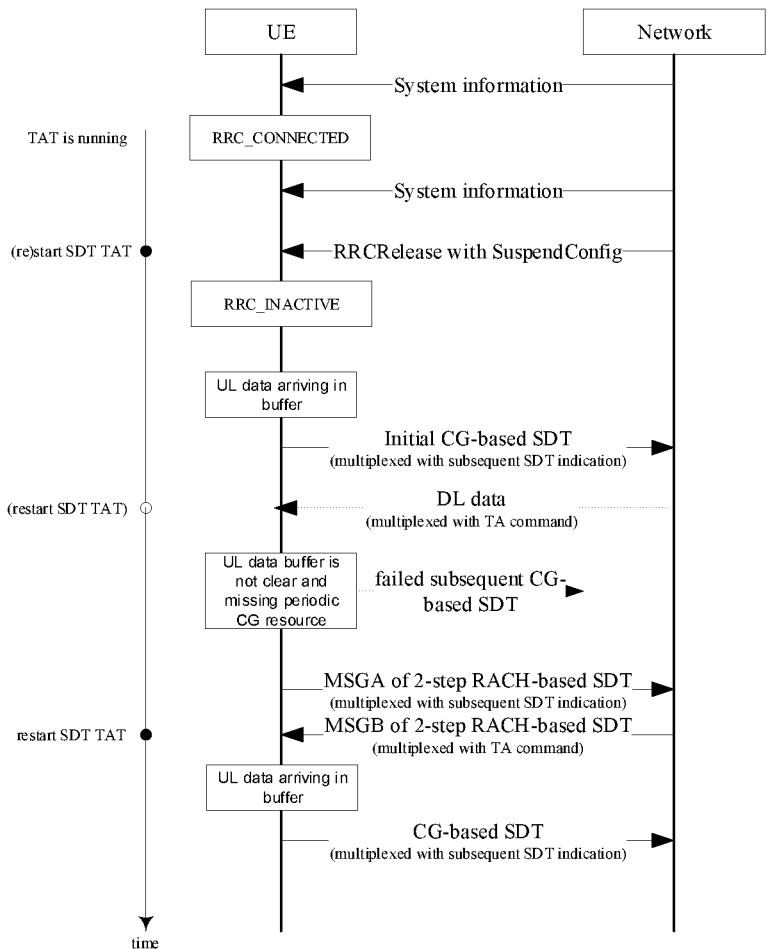
FIG. 14 is a flowchart of a method for SDT in RRC_I-NACTIVE state according to a ninth embodiment of the present disclosure.

FIG. 14 is a flowchart of a method for SDT in RRC_INACTIVE state according to a ninth embodiment of the present disclosure.

In FIG. 14, for a network supporting SDT in RRC_INACTIVE state, the common/UE-specific SDT configuration is transmitted in system information as specified the above. The network may broadcast/unicast the common/UE-specific SDT configuration (e.g., supported SDT types, SDT priority, common/UE-specific SDT search space, common SDT threshold, common SDT_RSRP threshold, SDT Paging configuration and search space, RACH-based SDT configuration, SDT PRACH configuration, etc.) via system information (e.g., SIB2, on-demand SI) for shared SDT UL grant within UEs. Some of UE-specific SDT configuration is transmitted in RRC signaling as specified the above. The network may unicast the UE-specific SDT configuration (e.g., supported SDT types, SDT priority, UE-specific SDT threshold, UE-specific SDT_RSRP threshold, CG-based SDT configuration, DL assignment configuration for SDT, SDT ran-PagingCycle, I-RNTI, release cause for SDT, etc.) via RRC signaling (e.g., RRCRelease) for dedicated SDT within UE(s). In FIG. 14, the RRCRelease including suspendConfig and UE-specific SDT configuration is transmitted by the network to suspend the RRC connection, the UE shall apply the received suspendConfig and UE-specific SDT configuration. The MAC entity is reset and accordingly Timing Alignment Timer associated with the TAG(s) is stopped or to be expired. The SDT Timing Advance Command MAC CE as specified in FIG. 4 can be transmitted along with MAC header of RRCRelease. Then the UE can apply the SDT Timing Advance Command upon the reception of RRCRelease. The SDT Timing Alignment Timer can be started or restarted for keeping UL time alignment during SDT in RRC_INACTIVE state. In some case, the legacy Timing Alignment Timer associated with the TAG(s) is restarted upon the reception of SDT Timing Advance Command MAC CE. After entering RRC_INACTIVE state and UL data arriving in UE TX buffer, the initial CG-based UL SDT is transmitted to the network while SDT Timing Alignment Timer is running. If necessary, DL data is transmitted on the DL assignment resource or multiplexed with the SDT paging message. For subsequent UL SDT, there should be a buffer status report or a subsequent SDT indication transmitted/multiplexed with initial UL CG-based SDT. The subsequent SDT indication may be at least one bit included in a control information (e.g., subsequent SDT MAC CE as specified in FIG. 5), a periodic/non-periodic set of PUCCH resources on the initial/default BWP or across different BWPs, a tail bit in data payload, or piggyback with SDT. The SDT Timing Advance Command MAC CE as specified in FIG. 4 can be replied by MAC header of SDT Paging, and/or along with DL data if necessary. Upon the reception of SDT Timing Advance Command MAC CE, the UE shall apply the SDT Timing Advance Command for the indicated TAG(s) and restart the SDT Timing Alignment Timer for the associated TAG(s). In some cases, if there is subsequent SDT or a new data waiting to be transmitted to the network but the UE may miss the transmission timing on CG resource due to some reasons (e.g., using an invalid TA value due to RSRP change), the UE may initiate the 2-step RACH-based SDT when UL SDT is ready and SDT threshold is met. The UL and DL small data is transmitted on the MSGA and MSGB respectively. Furthermore, the MSGA may contain RRCResumeRequest multiplexed with subsequent SDT indication, and MSGB contains RRCRelease multiplexed SDT Timing Advance Command MAC CE. The SDT Timing Alignment Timer is restarted upon the reception of SDT Timing Advance Command included in the MSGB. The CG-based resource can be re-activated after SDT Timing Alignment Timer is updated. In other words, after missing the transmission timing on CG resource in a period, the UE can still perform CG-based SDT following 2-step RACH-based SDT. In some other cases, the UE may initiate the 4-step RACH-based SDT (not shown in FIG. 14) when UL SDT is ready and SDT threshold is met. The UL and DL small data is transmitted on the MSG3 and MSG4 respectively. Furthermore, the MSG3 may contain RRCRe-sumeRequest multiplexed with subsequent SDT indication, and MSG4 contains RRCRelease multiplexed DL data, if necessary. The SDT Timing Alignment Timer is restarted upon the reception of SDT Timing Advance Command included in the MSG2. The CG-based resource can be re-activated after SDT Timing Alignment Timer is updated. In other words, after missing the transmission timing on CG resource in a period, the UE can still perform CG-based SDT following 4-step RACH-based SDT. When the UL synchro-nization/time alignment is maintained in RRC_INACTIVE state, CG-based SDT and subsequent RACH-based/CG-based SDT can be operated during RRC_INACTIVE state.

Figure 15:
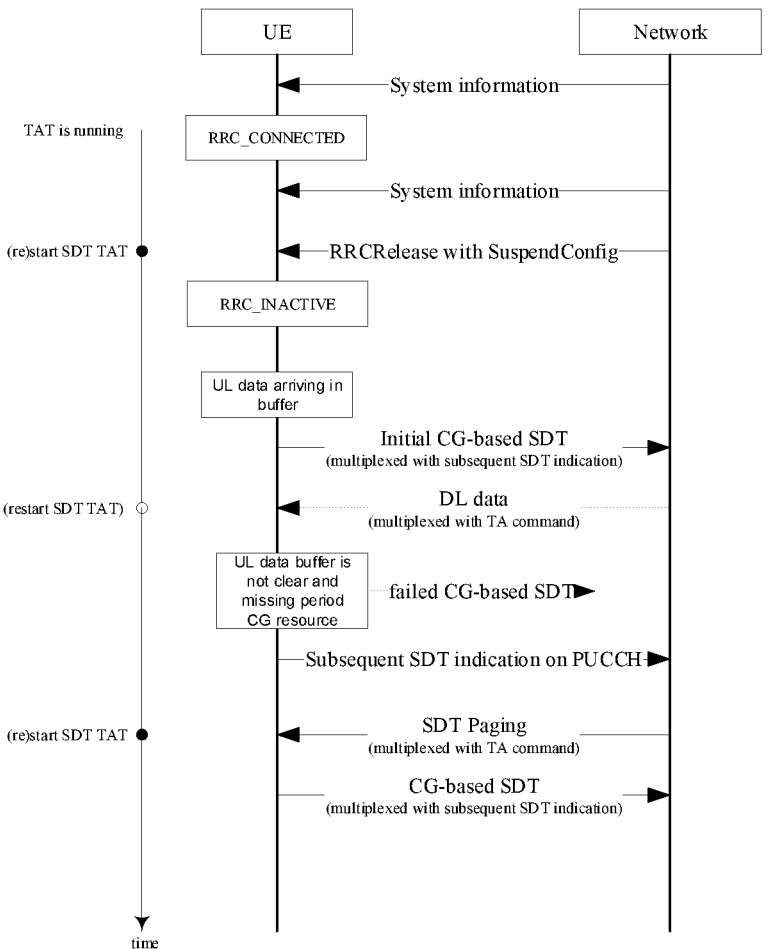
FIG. 15 is a flowchart of a method for SDT in RRC_I-NACTIVE state according to a tenth embodiment of the present disclosure.

FIG. 15 is a flowchart of a method for SDT in RRC_I-NACTIVE state according to a tenth embodiment of the present disclosure.

In FIG. 15, for a network supporting SDT in RRC_INAC-TIVE state, the common/UE-specific SDT configuration is transmitted in system information as specified the above. The network may broadcast/unicast the common/UE-spe-cific SDT configuration (e.g., supported SDT types, SDT priority, common/UE-specific SDT search space, common SDT threshold, common SDT_RSRP threshold, SDT Paging configuration and search space, RACH-based SDT configu-ration, SDT PRACH configuration, etc.) via system infor-mation (e.g., SIB2, on-demand SI) for shared SDT UL grant within UEs. Some of UE-specific SDT configuration is transmitted in RRC signaling as specified the above. The network may unicast the UE-specific SDT configuration (e.g., supported SDT types, SDT priority, UE-specific SDT threshold, UE-specific SDT_RSRP threshold, CG-based SDT configuration, DL assignment configuration for SDT, SDT ran-PagingCycle, I-RNTI, release cause for SDT, etc.) via RRC signaling (e.g., RRCRelease) for dedicated SDT within UE(s). In FIG. 15, the RRCRelease including sus-pendConfig and UE-specific SDT configuration is transmit-ted by the network to suspend the RRC connection, the UE shall apply the received suspendConfig and UE-specific SDT configuration. The MAC entity is reset and accordingly Timing Alignment Timer associated with the TAG(s) is stopped or to be expired. The SDT Timing Advance Com-mand MAC CE as specified in FIG. 4 can be transmitted along with MAC header of RRCRelease. Then the UE can apply the SDT Timing Advance Command upon the recep-tion of RRCRelease. The SDT Timing Alignment Timer can be started or restarted for keeping UL time alignment during SDT in RRC_INACTIVE state. In some case, the legacy Timing Alignment Timer associated with the TAG(s) is restarted upon the reception of SDT Timing Advance Com-mand MAC CE. After entering RRC_INACTIVE state and UL data arriving in UE TX buffer, the initial CG-based UL SDT is transmitted to the network while SDT Timing Alignment Timer is running. If necessary, DL data is trans-mitted on the DL assignment resource or multiplexed with the SDT paging message. For subsequent UL SDT, there should be a buffer status report or a subsequent SDT indication transmitting/multiplexing with initial UL SDT in CG-based SDT. The subsequent SDT indication may be at least one bit included in a control information (e.g., subse-quent SDT MAC CE as specified in FIG. 5), a periodic/non-periodic set of PUCCH resources on the initial/default BWP or across different BWPs, a tail bit in data payload, or piggyback with SDT. The SDT Timing Advance Command MAC CE as specified in FIG. 4 can be replied by MAC header of SDT Paging, and/or along with DL data if neces-sary. Upon the reception of SDT Timing Advance Command MAC CE, the UE shall apply the SDT Timing Advance Command for the indicated TAG(s) and restart the SDT Timing Alignment Timer for the associated TAG(s). In some cases, if there is subsequent SDT or a new data waiting to be transmitted to the network but the UE may miss the trans-mission timing on CG resource due to some reasons (e.g., using an invalid TA value due to RSRP change), the UE may transmit the subsequent SDT indication for requiring timing alignment. The SDT Timing Alignment Timer can be started or restarted by using SDT paging as specified in FIG. 4. When the UL synchronization/time alignment is maintained in RRC_INACTIVE state, CG-based SDT and subsequent RACH-based/CG-based SDT can be operated during RRC_INACTIVE state.

Figure 16:
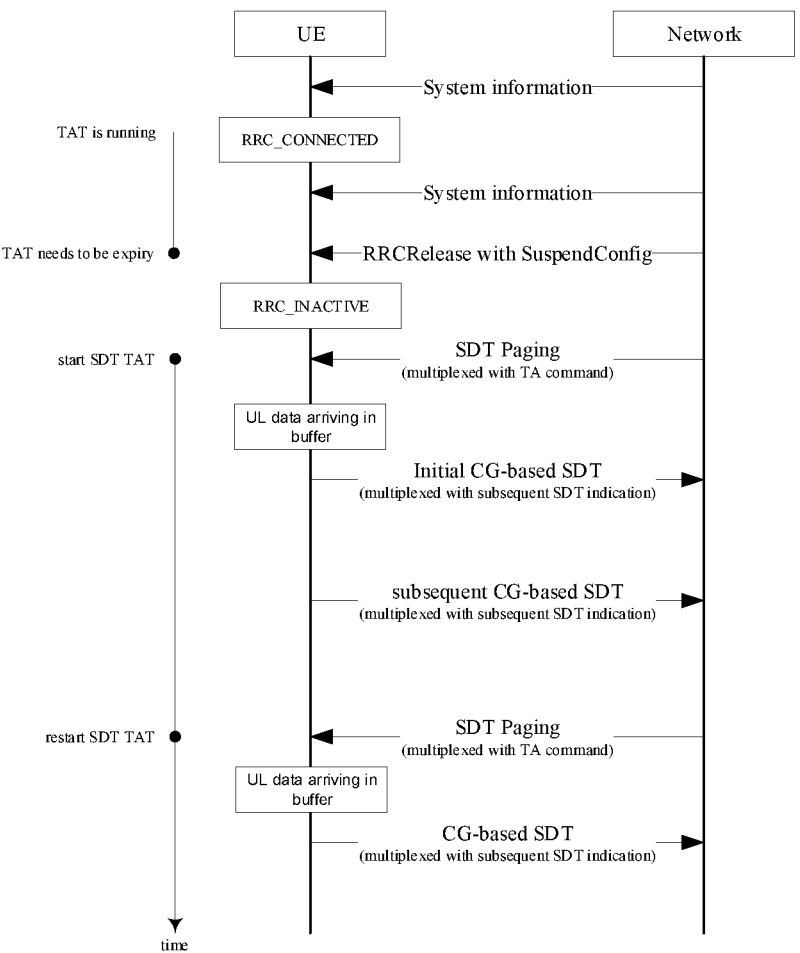
FIG. 16 is a flowchart of a method for SDT in RRC_I-NACTIVE state according to an eleventh embodiment of the present disclosure.

FIG. 16 is a flowchart of a method for SDT in RRC_I-NACTIVE state according to an eleventh embodiment of the present disclosure.

In FIG. 16, for a network supporting SDT in RRC_INAC-TIVE state, the common/UE-specific SDT configuration is transmitted in system information as specified the above. The network may broadcast/unicast the common/UE-spe-cific SDT configuration (e.g., supported SDT types, SDT priority, common/UE-specific SDT search space, common SDT threshold, common SDT_RSRP threshold, SDT Paging configuration and search space, RACH-based SDT configu-ration, SDT PRACH configuration, etc.) via system infor-mation (e.g., SIB2, on-demand SI) for shared SDT UL grant within UEs. Some of UE-specific SDT configuration is transmitted in RRC signaling as specified the above. The network may unicast the UE-specific SDT configuration (e.g., supported SDT types, SDT priority, UE-specific SDT threshold, UE-specific SDT_RSRP threshold, CG-based SDT configuration, DL assignment configuration for SDT, SDT ran-PagingCycle, I-RNTI, release cause for SDT, etc.) via RRC signaling (e.g., RRCRelease) for dedicated SDT within UE(s). In FIG. 16, the RRCRelease including sus-pendConfig and UE-specific SDT configuration is transmit-ted by the network to suspend the RRC connection, the UE shall apply the received suspendConfig and UE-specific SDT configuration. The MAC entity is reset and accordingly Timing Alignment Timer associated with the TAG(s) is stopped or to be expired. After entering RRC_INACTIVE state, a SDT Timing Advance Command MAC CE as specified in FIG. 4 can be transmitted along with MAC header of SDT paging. Then the UE can apply the SDT Timing Advance Command upon the reception of SDT paging. The SDT Timing Alignment Timer can be started for keeping UL time alignment during SDT in RRC_INAC-TIVE state. When UL data arriving in UE TX buffer, the initial CG-based UL SDT is transmitted to the network while SDT Timing Alignment Timer is running. In other words, CG-based SDT can only be initiated upon the running SDT Timing Alignment Timer. The subsequent SDT indication may be transmitted/multiplexed with initial UL CG-based SDT. The subsequent SDT indication may be at least one bit included in a control information (e.g., subsequent SDT MAC CE as specified in FIG. 5), a periodic/non-periodic set of PUCCH resources on the initial/default BWP or across different BWPs, a tail bit in data payload, or piggyback with SDT. In some cases, the subsequent SDT indication may indicate there is further subsequent SDT is waiting to be transmitted to the network and then CG-based SDT is easy to keep working while UL timing alignment is maintained. In some other cases, if the subsequent SDT indication indicates there is no further SDT for transmission over a period, the network can determine whether to deactivate the allocated SDT resources for the UE and maintain the SDT Timing Alignment Timer for the UE by using SDT paging as specified in FIG. 4. If the network determines to maintain the CG-based resource allocation, the CG-based SDT can be transmitted with low latency and low power consumption in RRC_INACTIVE state. If the network determines to deactivate the CG-based resource allocation, the CG-based resource can be deactivated upon the reception of subsequent SDT indication, for example, by PUCCH (not shown). After that in a period, the UE can still perform CG-based SDT while SDT Timing Alignment Timer is running. When the UL synchronization/time alignment is maintained in RRC_INACTIVE state, CG-based SDT and subsequent CG-based SDT can be operated during RRC_INACTIVE state.

Figure 17:
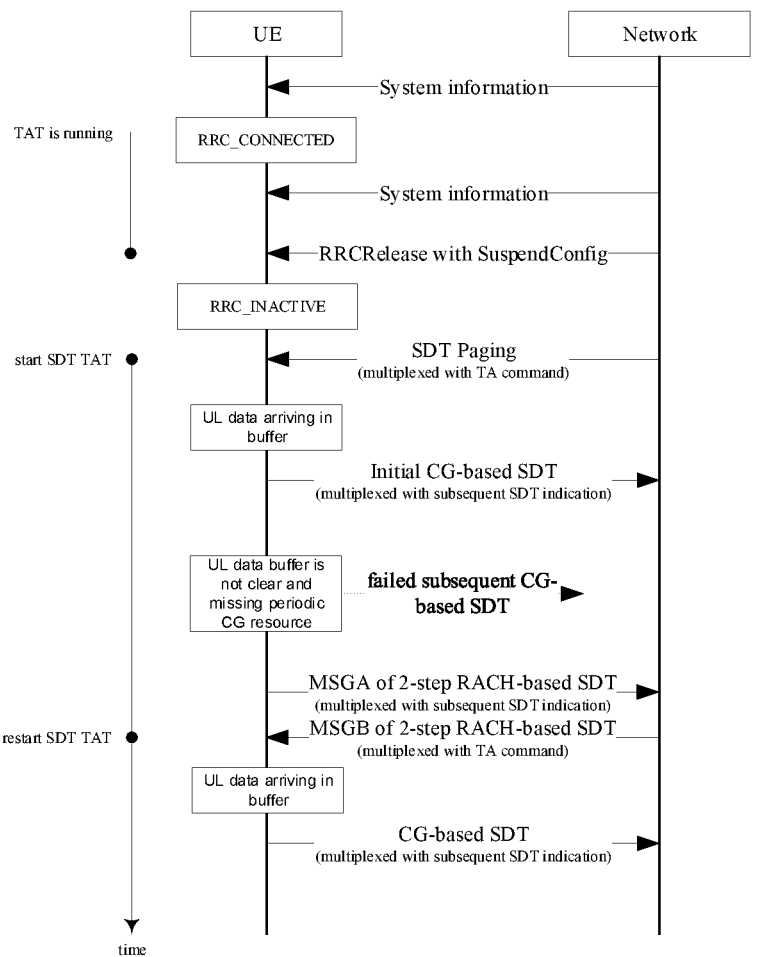
FIG. 17 is a flowchart of a method for SDT in RRC_I-NACTIVE state according to a twelfth embodiment of the present disclosure.

FIG. 17 is a flowchart of a method for SDT in RRC_I-NACTIVE state according to a twelfth embodiment of the present disclosure.

In FIG. 17, for a network supporting SDT in RRC_INAC-TIVE state, the common/UE-specific SDT configuration is transmitted in system information as specified the above. The network may broadcast/unicast the common/UE-specific SDT configuration (e.g., supported SDT types, SDT priority, common/UE-specific SDT search space, common SDT threshold, common SDT_RSRP threshold, SDT Paging configuration and search space, RACH-based SDT configuration, SDT PRACH configuration, etc.) via system information (e.g., SIB2, on-demand SI) for shared SDT UL grant within UEs. Some of UE-specific SDT configuration is transmitted in RRC signaling as specified the above. The network may unicast the UE-specific SDT configuration (e.g., supported SDT types, SDT priority, UE-specific SDT threshold, UE-specific SDT_RSRP threshold, CG-based SDT configuration, DL assignment configuration for SDT, SDT ran-PagingCycle, I-RNTI, release cause for SDT, etc.) via RRC signaling (e.g., RRCRelease) for dedicated SDT within UE(s). In FIG. 17, the RRCRelease including suspendConfig and UE-specific SDT configuration is transmitted by the network to suspend the RRC connection, the UE shall apply the received suspendConfig and UE-specific SDT configuration. The MAC entity is reset and accordingly Timing Alignment Timer associated with the TAG(s) is stopped or to be expired. After entering RRC_INACTIVE state, a SDT Timing Advance Command MAC CE as specified in FIG. 4 can be transmitted along with MAC header of SDT paging. Then the UE can apply the SDT Timing Advance Command upon the reception of SDT paging. The SDT Timing Alignment Timer can be started for keeping UL time alignment during SDT in RRC_INAC-TIVE state. When UL data arriving in UE TX buffer, the initial CG-based UL SDT is transmitted to the network while SDT Timing Alignment Timer is running. In other words, CG-based SDT can only be initiated upon the running SDT Timing Alignment Timer. The subsequent SDT indication may be transmitted/multiplexed with initial UL CG-based SDT. The subsequent SDT indication may be at least one bit included in a control information (e.g., subsequent SDT MAC CE as specified in FIG. 5), a periodic/non-periodic set of PUCCH resources on the initial/default BWP or across different BWPs, a tail bit in data payload, or piggyback with SDT. In some cases, if there is subsequent SDT or a new data waiting to be transmitted to the network but the UE may miss the transmission timing on CG resource due to some reasons (e.g., using an invalid TA value due to RSRP change), the UE may initiate the 2-step RACH-based SDT when UL SDT is ready and SDT threshold is met. The UL and DL small data is transmitted on the MSGA and MSGB respectively. Furthermore, the MSGA may contain RRCRe-sumeRequest multiplexed with subsequent SDT indication, and MSGB contains RRCRelease multiplexed SDT Timing Advance Command MAC CE. The SDT Timing Alignment Timer is restarted upon the reception of SDT Timing Advance Command included in the MSGB. The CG-based resource can be re-activated after SDT Timing Alignment Timer is updated. In other words, after missing the transmission timing on CG resource in a period, the UE can still perform CG-based SDT following 2-step RACH-based SDT. In some other cases, the UE may initiate the 4-step RACH-based SDT (not shown in FIG. 17) when UL SDT is ready and SDT threshold is met. The UL and DL small data is transmitted on the MSG3 and MSG4 respectively. Furthermore, the MSG3 may contain RRCResumeRequest mul-tiplexed with subsequent SDT indication, and MSG4 con-tains RRCRelease multiplexed DL data, if necessary. The SDT Timing Alignment Timer is restarted upon the recep-tion of SDT Timing Advance Command included in the MSG2. The CG-based resource can be re-activated after SDT Timing Alignment Timer is updated. In other words, after missing the transmission timing on CG resource in a period, the UE can still perform CG-based SDT following 4-step RACH-based SDT. When the UL synchronization/time alignment is maintained in RRC_INACTIVE state, CG-based SDT and subsequent RACH-based/CG-based SDT can be operated during RRC_INACTIVE state.

Figure 18:
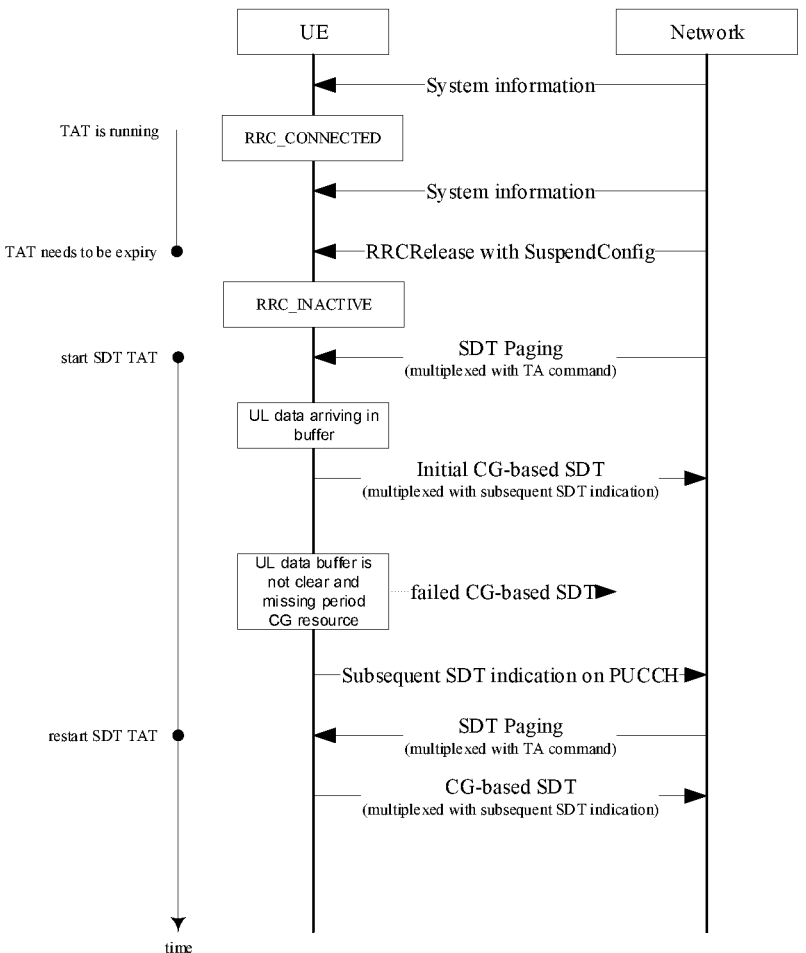
FIG. 18 is a flowchart of a method for SDT in RRC_I-NACTIVE state according to a thirteenth embodiment of the present disclosure.

FIG. 18 is a flowchart of a method for SDT in RRC_I-NACTIVE state according to a thirteenth embodiment of the present disclosure.

In FIG. 18, for a network supporting SDT in RRC_INAC-TIVE state, the common/UE-specific SDT configuration is transmitted in system information as specified the above. The network may broadcast/unicast the common/UE-spe-cific SDT configuration (e.g., supported SDT types, SDT priority, common/UE-specific SDT search space, common SDT threshold, common SDT_RSRP threshold, SDT Paging configuration and search space, RACH-based SDT configu-ration, SDT PRACH configuration, etc.) via system infor-mation (e.g., SIB2, on-demand SI) for shared SDT UL grant within UEs. Some of UE-specific SDT configuration is transmitted in RRC signaling as specified the above. The network may unicast the UE-specific SDT configuration (e.g., supported SDT types, SDT priority, UE-specific SDT threshold, UE-specific SDT_RSRP threshold, CG-based SDT configuration, DL assignment configuration for SDT, SDT ran-PagingCycle, I-RNTI, release cause for SDT, etc.) via RRC signaling (e.g., RRCRelease) for dedicated SDT within UE(s). In FIG. 18, the RRCRelease including sus-pendConfig and UE-specific SDT configuration is transmit-ted by the network to suspend the RRC connection, the UE shall apply the received suspendConfig and UE-specific SDT configuration. The MAC entity is reset and accordingly Timing Alignment Timer associated with the TAG(s) is stopped or to be expired. After entering RRC_INACTIVE state, a SDT Timing Advance Command MAC CE as specified in FIG. 4 can be transmitted along with MAC header of SDT paging. Then the UE can apply the SDT Timing Advance Command upon the reception of SDT paging. The SDT Timing Alignment Timer can be started for keeping UL time alignment during SDT in RRC_INACTIVE state. When UL data arriving in UE TX buffer, the initial CG-based UL SDT is transmitted to the network while SDT Timing Alignment Timer is running. In other words, CG-based SDT can only be initiated upon the running SDT Timing Alignment Timer. The subsequent SDT indication may be transmitted/multiplexed with initial UL CG-based SDT. The subsequent SDT indication may be at least one bit included in a control information (e.g., subsequent SDT MAC CE as specified in FIG. 5), a periodic/non-periodic set of PUCCH resources on the initial/default BWP or across different BWPs, a tail bit in data payload, or piggyback with SDT. In some cases, if there is subsequent SDT or a new data waiting to be transmitted to the network but the UE may miss the transmission timing on CG resource due to some reasons (e.g., using an invalid TA value due to RSRP change), the UE may transmit the subsequent SDT indication for requiring timing alignment. The SDT Timing Alignment Timer can be started or restarted by using SDT paging as specified in FIG. 4. When the UL synchronization/time alignment is maintained in RRC_INACTIVE state, CG-based SDT and subsequent RACH-based/CG-based SDT can be operated during RRC_INACTIVE state.

Figure 19:
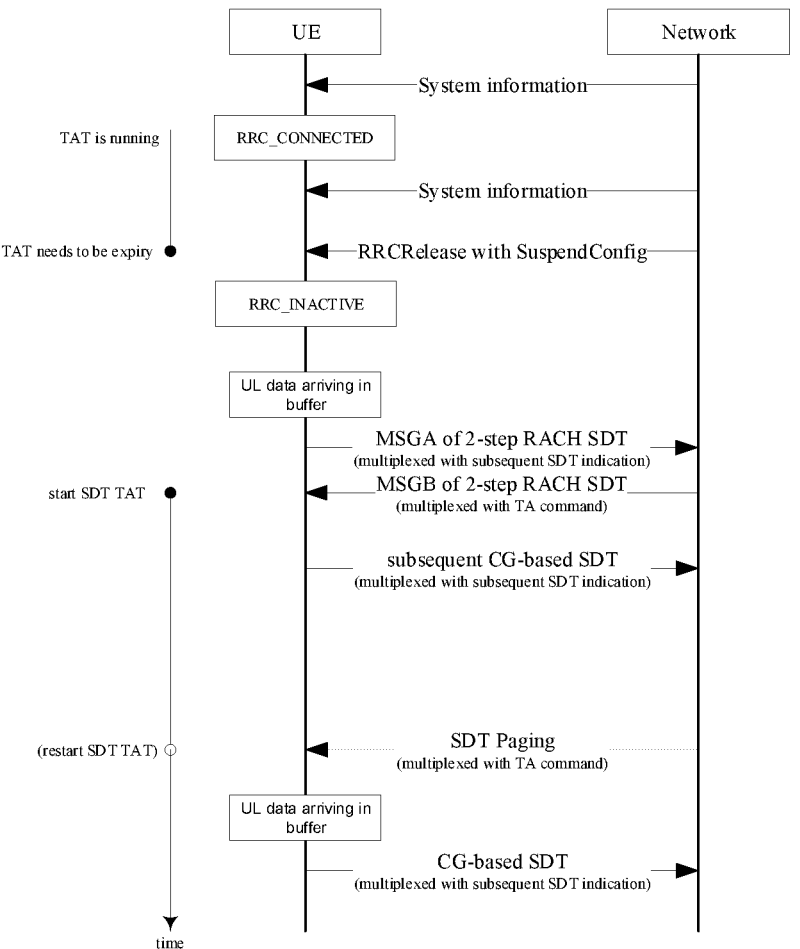
FIG. 19 is a flowchart of a method for SDT in RRC_I-NACTIVE state according to a fourteenth embodiment of the present disclosure.

FIG. 19 is a flowchart of a method for SDT in RRC_INACTIVE state according to a fourteenth embodiment of the present disclosure.

In FIG. 19, for a network supporting SDT in RRC_INACTIVE state, the common/UE-specific SDT configuration is transmitted in system information as specified the above. The network may broadcast/unicast the common/UE-specific SDT configuration (e.g., supported SDT types, SDT priority, common/UE-specific SDT search space, common SDT threshold, common SDT_RSRP threshold, SDT Paging configuration and search space, RACH-based SDT configuration, SDT PRACH configuration, etc.) via system information (e.g., SIB2, on-demand SI) for shared SDT UL grant within UEs. Some of UE-specific SDT configuration is transmitted in RRC signaling as specified the above. The network may unicast the UE-specific SDT configuration (e.g., supported SDT types, SDT priority, UE-specific SDT threshold, UE-specific SDT_RSRP threshold, CG-based SDT configuration, DL assignment configuration for SDT, SDT ran-PagingCycle, I-RNTI, release cause for SDT, etc.) via RRC signaling (e.g., RRCRelease) for dedicated SDT within UE(s). In FIG. 19, the RRCRelease including suspendConfig and UE-specific SDT configuration is transmitted by the network to suspend the RRC connection, the UE shall apply the received suspendConfig and UE-specific SDT configuration. The MAC entity is reset and accordingly Timing Alignment Timer associated with the TAG(s) is stopped or to be expired. After entering RRC_INACTIVE state and UL data arriving in UE TX buffer, the UE may initiate the 2-step or 4-step RACH-based SDT based on SDT threshold to trigger SDT Timing Alignment Timer. If the UE determine to initiate the 2-step RACH-based SDT, the UL and optional DL small data is transmitted on the MSGA and MSGB respectively. Furthermore, the MSGA may contain RRCResumeRequest multiplexed with subsequent SDT indication, and MSGB contains RRCRelease multiplexed SDT Timing Advance Command MAC CE. The SDT Timing Alignment Timer is started upon the reception of SDT Timing Advance Command included in the MSGB. If the UE determine to initiate the 4-step RACH-based SDT (not shown in FIG. 19), The UL and DL small data is transmitted on the MSG3 and MSG4 respectively. Furthermore, the MSG3 may contain RRCResumeRequest multiplexed with subsequent SDT indication, and MSG4 contains RRCRelease multiplexed DL data, if necessary. The SDT Timing Alignment Timer is started upon the reception of SDT Timing Advance Command included in the MSG2. In some cases, the subsequent SDT indication may indicate there is further subsequent SDT is waiting to be transmitted to the network and then CG-based SDT is easy to keep working while UL timing alignment is maintained. In some other cases, if the subsequent SDT indication indicates there is no further SDT for transmission over a period, the network can determine whether to deactivate the allocated SDT resources for the UE and maintain the SDT Timing Alignment Timer for the UE by using SDT paging as specified in FIG. 4. If the network determines to maintain the CG-based resource allocation, the CG-based SDT can be transmitted with low latency and low power consumption in RRC_INACTIVE state. If the network determines to deactivate the CG-based resource allocation, the CG-based resource can be deactivated upon the reception of subsequent SDT indication, for example, by PUCCH (not shown). After that in a period, the UE can still perform CG-based SDT while SDT Timing Alignment Timer is running. When the UL synchronization/time alignment is maintained in RRC_INACTIVE state, CG-based SDT and subsequent CG-based SDT can be operated during RRC_INACTIVE state.

In accordance with another aspect of the present invention, when SDT is transparent to NAS layer, upon the arriving UL data from the higher layer, the SDT threshold is used for the UE to determine whether to perform SDT in RRC_INACTIVE state or not. When the data volume of the UE is larger than the SDT threshold, the UE will transit to the RRC_CONNECTED state for normal data transmission procedure. Otherwise, the UE may initiate CG-based or RACH-based SDT in RRC_INACTIVE state. Upon the reception of resumption request from the UE, the network shall initiate the UE context resume procedure for reactivating the NAS connection. Based on all the embodiments, if the network is a RAN functional split node(s), the UL/DL SDT can be transparent between Central Unit (CU) and Distributed Unit(s)(DU(s)) via F1 interface and signaling.

In accordance with another aspect of the present invention, when SDT in RRC_INACTIVE state is supported for CA duplication, the Timing Alignment Timer of Secondary Timing Advance Group (sTAG) shall be maintain by the network and the UE. When the UL synchronization/time alignment with the associated TAG(s) is maintained in RRC_INACTIVE state, small data can be transmitted during RRC_INACTIVE state.

In accordance with another aspect of the present invention, when SDT in RRC_INACTIVE state is considered on Bandwidth Part (BWP) adaptation, the network is configured with one or multiple BWPs. There is one or more specific BWPs (e.g., initial, default, activated BWP(s)) is configured to transmit SDT in RRC_INACTIVE state. The BWP switching for the RACH-based SDT is used to transmit SDT in RRC_INACTIVE state. The UL/DL data can be transmitted on the associated BWP according to the same UL/DL BWP bwp-Id/linkage.

Commercial interests for some embodiments are as follows. 1. Solving issues in the prior art. 2. realizing UL synchronization/timing maintenance. 3. improving resource efficiency. 4. improving power consumption and signaling overhead. 5. providing a good communication performance. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product. Some embodiments of the present disclosure could be adopted in the 5G NR unlicensed band communications. Some embodiments of the present disclosure propose technical mechanisms.

The main advantages of the methods of this disclosure at least include one of the following:

Lower power consumption for small data transmission in RRC_INACTIVE state

Lower data transmission latency in RRC_INACTIVE state

UL synchronization/timing maintenance in RRC_INACTIVE state

Better resource efficiency for 5G networks

Lower signaling overhead for small data transmission in RRC_INACTIVE state

Timing recovery for the configured grant

RAN functional split, carrier aggregation duplication, and BWP adaptation is considered on small data transmission in RRC_INACTIVE state.

The embodiment of the present application further provides a computer readable storage medium for storing a computer program. The computer readable storage medium enables a computer to execute corresponding processes implemented by the UE/BS in each of the methods of the embodiment of the present disclosure. For brevity, details will not be described herein again.

The embodiment of the present application further provides a computer program product including computer program instructions. The computer program product enables a computer to execute corresponding processes implemented by the UE/BS in each of the methods of the embodiment of the present disclosure. For brevity, details will not be described herein again.

The embodiment of the present application further provides a computer program. The computer program enables a computer to execute corresponding processes implemented by the UE/BS in each of the methods of the embodiment of the present disclosure. For brevity, details will not be described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different approaches to implement the described functions for each particular application, but it should not be considered that the implementation goes beyond the scope of the present application.

While the present application has been described in connection with what is considered the most practical and preferred embodiments, it is understood that the present application is not limited to the disclosed embodiments but is intended to cover various arrangements made without departing from the scope of the broadest interpretation of the appended claims.

The invention claimed is:

1. A method for small data transmission (SDT) in RRC_INACTIVE state, performed by a user equipment (UE) in a network, the method comprising:

receiving a SDT configuration, which is used for configuring SDT UL grant, wherein the SDT configuration comprises a SDT threshold;

based on the SDT threshold, determining which type of SDT procedures is to be applied in RRC_INACTIVE state;

upon reception of a Timing Advance (TA) command in the RRC_INACTIVE state, applying the TA command, and starting or restarting Timing Alignment Timer (TAT) for keeping uplink (UL) time alignment during SDT in the RRC_INACTIVE state; and applying the determined SDT procedure based on the started or restarted TAT, wherein the SDT configuration or the SDT UL grant is sustained even if the TAT expires, wherein the method further comprises:

performing, after entering the RRC_INACTIVE state, initial RACH-based SDT to trigger the TAT; and after the initial RACH-based SDT, performing Configured grant (CG) based SDT during the RRC_INACTIVE state upon maintenance of the TAT.

2. The method of claim 1, wherein the SDT configuration comprises a SDT_reference signal received power (RSRP) threshold, and the method further comprises:

based on the SDT_RSRP threshold, determining whether to perform activation of the SDT UL grant in the RRC_INACTIVE state.

3. The method of claim 2, wherein when the channel quality is lower than the SDT_RSRP threshold, the SDT procedure is deactivated and the UE transitions to RRC_CONNECTED state for normal data transmission procedure.

4. The method of claim 1, wherein the TA command is carried by Media Access Control (MAC) Control Element (CE).

5. The method of claim 1, wherein the TA command is transmitted along with a SDT paging message.

6. The method of claim 1, wherein the TA command is included in random access response (RAR) message from the network.

7. The method of claim 1, wherein the reception of the TA command in the RRC_INACTIVE state is carried out by:

transmitting a subsequent SDT indication for requesting time alignment; and receiving the TA command which is in response to the subsequent SDT indication.

8. The method of claim 1, wherein the TA Command is a SDT TA command specified for SDT in the RRC_INACTIVE state.

9. The method of claim 1, further comprising:

after missing transmission timing on CG-based resource, performing CG-based SDT following RACH-based SDT, wherein the CG-based resource on which the CG-based SDT is transmitted is reactivated after the TAT is updated through the RACH-based SDT.

10. The method of claim 1, further comprising:

after missing transmission timing on CG-based resource, transmitting a subsequent SDT indication for requesting timing alignment in the RRC_INACTIVE state.

11. The method of claim 1, further comprising:

after the initial RACH-based SDT, determining CG-based SDT, 2-step RACH-based SDT or 4-step RACH-based SDT based on the SDT threshold while the TAT is running.

12. The method of claim 1, further comprising:

transmitting a subsequent SDT indication to the network for requesting the TAT to be restarted in the RRC_I-NACTIVE state.

13. The method of claim 12, wherein the subsequent SDT indication is included in MSGA of a 2-step RACH SDT or MSG3 of a 4-step RACH SDT.

14. A user equipment (UE), comprising a memory, a transceiver and a processor coupled to the memory and the transceiver, the processor configured to call and run program instructions stored in a memory, to execute the method of claim 1.

15. A method for small data transmission (SDT) in RRC_INACTIVE state, performed by a base station (BS), the method comprising:

transmitting to a user equipment (UE) a SDT configuration, which is used for configuring SDT UL grant, wherein the SDT configuration comprises a SDT threshold;

expecting the UE to determine, based on the SDT threshold, which type of SDT procedures is to be applied in RRC_INACTIVE state;

upon transmission of a Timing Advance (TA) command in the RRC_INACTIVE state, expecting the UE to apply the TA command, and start or restart Timing Alignment Timer (TAT) for keeping uplink (UL) time alignment during SDT in the RRC_INACTIVE state; and expecting the UE to apply the determined SDT procedure based on the started or restarted TAT, wherein the BS expects the UE to sustain the SDT configuration or the SDT UL grant even if the TAT expires, wherein the method further comprises:

expecting the UE to perform, after entering the RRC_I-NACTIVE state, initial RACH-based SDT to trigger the TAT; and expecting the UE to perform, after the initial RACH-based SDT, the CG-based SDT during the RRC_INAC-TIVE state upon maintenance of the TAT.

16. A base station (BS), comprising a memory, a transceiver and a processor coupled to the memory and the transceiver, the processor configured to call and run program instructions stored in a memory, to execute the method of claim 15.

\*   \*   \*   \*   \*